United States Patent
Sachdeva et al.

(10) Patent No.: US 11,403,555 B2
(45) Date of Patent: Aug. 2, 2022

(54) SEQUENCE, FREQUENCY, AND TIME INTERVAL BASED JOURNEY RECOMMENDATION

(71) Applicant: ACCENTURE GLOBAL SOLUTIONS LIMITED, Dublin (IE)

(72) Inventors: Ruchika Sachdeva, Bad Soden am Taunus (DE); Samik Adhikary, Frankfurt (DE); Nilesh Kumar Gupta, New Delhi (IN); Payal Gupta, Frankfurt (DE); Daniel Pielak-Watkins, Philadelphia, PA (US); Kusha Arora, Frankfurt (DE); Elfin Garg, New Delhi (IN); Nakul Puri, Gurugram (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 539 days.

(21) Appl. No.: 16/297,314

(22) Filed: Mar. 8, 2019

(65) Prior Publication Data
US 2020/0285990 A1 Sep. 10, 2020

(51) Int. Cl.
*G06Q 30/02* (2012.01)
*G06N 20/00* (2019.01)
*G06N 7/00* (2006.01)

(52) U.S. Cl.
CPC .............. *G06N 20/00* (2019.01); *G06N 7/005* (2013.01); *G06Q 30/0201* (2013.01); *G06Q 30/0202* (2013.01)

(58) Field of Classification Search
CPC .... G06N 20/00; G06N 7/005; G06Q 30/0202; G06Q 30/0201; H04L 41/0823; H04L 41/147; H04L 41/145
See application file for complete search history.

(56) References Cited

U.S. PATENT DOCUMENTS

2009/0132865 A1 5/2009 Meng et al.
2013/0158855 A1 6/2013 Weir et al.
(Continued)

FOREIGN PATENT DOCUMENTS

EP 3361674 8/2018

OTHER PUBLICATIONS

"Optimal Sequential Exploration: A Binary Learning Model" (Bickel, J. & Smith, James. (2006). 3. 16-32. 10.1287/deca.1050.0052); (Year: 2006).*

(Continued)

*Primary Examiner* — James M Detweiler
(74) *Attorney, Agent, or Firm* — Mannava & Kang, P.C.

(57) ABSTRACT

In some examples, sequence, frequency, and time interval based journey recommendation may include generating a plurality of clusters of entities, and generating a network that identifies a time interval to a next interaction that leads to success. An estimated time interval to a specified number of conversions may be determined. A success criterion that represents a positive outcome in the estimated time interval may be determined. A historical sequence of events may be partitioned into a plurality of sequences of events leading to success or failure. The plurality of sequence of events may be mapped based on analyzed probabilities, a determined waiting interval, and determined frequency contributions, and evaluated as to whether a mapped sequence of events duration is less than a planned duration. If so, a journey may be generated and include a determined sequence of events, a corresponding frequency, and a corresponding waiting interval.

20 Claims, 14 Drawing Sheets

(56) References Cited

U.S. PATENT DOCUMENTS

| | | |
|---|---|---|
| 2015/0161658 A1* | 6/2015 | Little ................. G06Q 30/0243 |
| | | 705/14.45 |
| 2016/0042388 A1* | 2/2016 | Chater .................... H04L 67/22 |
| | | 705/14.45 |
| 2016/0071126 A1 | 3/2016 | Chang et al. |
| 2016/0210658 A1* | 7/2016 | Chittilappilly ..... G06Q 30/0246 |
| 2017/0046734 A1 | 2/2017 | Chittilappilly et al. |
| 2017/0103403 A1 | 4/2017 | Chu et al. |
| 2017/0372347 A1 | 12/2017 | Li et al. |
| 2019/0278378 A1* | 9/2019 | Yan ....................... G06F 3/0481 |
| 2020/0273052 A1* | 8/2020 | Ganti ................ G06Q 30/0202 |

OTHER PUBLICATIONS

Lightbody et al., "Algorithmic Marketing Attribution and Conversion Journey Analysis Using SAS® Customer Intelligence 360", SAS2111-2018, published 2018, 14 pages.

Conely, "Machine learning and the customer journey", posted online on Feb. 9, 2017, 5 pages.

\* cited by examiner

SEQUENCE, FREQUENCY, AND TIME INTERVAL BASED JOURNEY RECOMMENDATION

BACKGROUND

A variety of actions may be performed to procure a product or service, or to perform a specified task. For example, in an information technology domain, a variety of tasks may be performed to manage information technology products and services. Examples of tasks in the information technology domain may include procurement of applications, management of the procured applications and related processes, etc. For the information technology domain, various aspects related to the management of the procured applications and related processes may impact the quality of the management.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
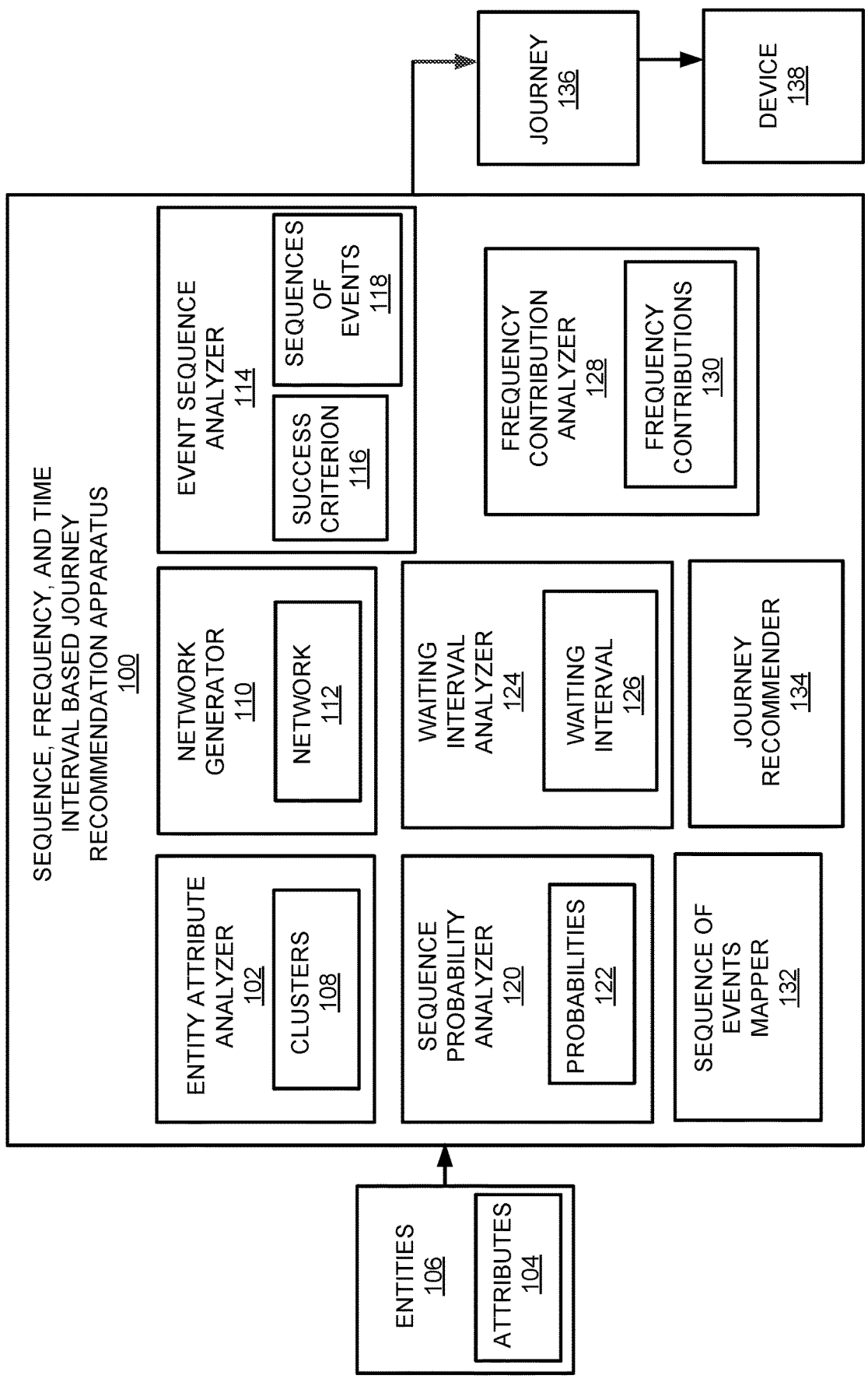
FIG. 1 illustrates a layout of a sequence, frequency, and time interval based journey recommendation apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Sequence, frequency, and time interval based journey recommendation apparatuses, methods for sequence, frequency, and time interval based journey recommendation, and non-transitory computer readable media having stored thereon machine readable instructions to provide sequence, frequency, and time interval based journey recommendation are disclosed herein. The apparatuses, methods, and non-transitory computer readable media disclosed herein provide for sequence, frequency, and time interval based journey recommendation by partitioning and analyzing history, such as entity (e.g., consumer) history, into a plurality of sequences of events to facilitate analysis of all of the available history with respect to events associated with the entity. The apparatuses, methods, and non-transitory computer readable media disclosed herein further provide an optimization framework that provides for customized journey recommendations based on constraints such as marketing budget, sales goal, planning time period, etc. Further, the apparatuses, methods, and non-transitory computer readable media disclosed herein provide for implementation of machine learning to recommend a journey that represents a correct sequence of activities such as marketing activities, a correct exposure, and a time interval between such activities for maximum impact.

With respect to procurement of a product or service, or performance of a specified task, an entity may interact with a plurality of channels to procure a product or service, or to perform a specified task. The length of a search or interaction may increase substantially within a relatively short time duration. In this regard, it is technically challenging to analyze an entire history related to the entity to determine what the correct channel of interaction is for the future.

For example, with respect to procurement of a product, a historical set of data for an entity may be analyzed to determine that a next correct channel of interaction includes "performing a search or sending an email." However, it is technically challenging to analyze an entire history related to the entity to determine that a correct channel of interaction includes "performing a search and sending an email after four days of performing the search" to obtain a maximum impact of a recommended journey.

The apparatuses, methods, and non-transitory computer readable media disclosed herein address at least the aforementioned technical challenges by evaluating an entire history related to an entity, and generating results that account for aspects such as sequence of events, frequency of events, and time interval between events.

According to examples disclosed herein, the apparatuses, methods, and non-transitory computer readable media disclosed herein may take into account an entire customer history to make predictions in real time, and may further converge to a journey recommendation to thus generate optimal predictions.

According to examples disclosed herein, the apparatuses, methods, and non-transitory computer readable media disclosed herein may prescribe a series of successive recommendations according to a selected interval dynamically and in real time.

According to examples disclosed herein, the apparatuses, methods, and non-transitory computer readable media disclosed herein may prescribe the sequence, frequency, and time interval for each of the aforementioned successive recommendations.

According to examples disclosed herein, the apparatuses, methods, and non-transitory computer readable media disclosed herein may be applicable to any industry. For example, the apparatuses, methods, and non-transitory computer readable media disclosed herein may be applicable to industries such as pharma, information technology, healthcare, retail and marketing, etc., and generally any industry that may include procurement of a product or service, or performance of a specified task.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example sequence, frequency, and time interval based journey recommendation apparatus (hereinafter also referred to as "apparatus 100").

Referring to FIG. 1, the apparatus 100 may include an entity attribute analyzer 102 that is executed by at least one hardware processor (e.g., the hardware processor 602 of FIG. 6, and/or the hardware processor 804 of FIG. 8) to analyze attributes 104 for a plurality of entities 106. Further, the entity attribute analyzer 102 may generate, based on the analysis of the plurality of attributes 104, a plurality of clusters 108 of entities. Each cluster of the plurality of clusters 108 may include similar attributes from the analyzed attributes.

A network generator 110 that is executed by at least one hardware processor (e.g., the hardware processor 602 of FIG. 6, and/or the hardware processor 804 of FIG. 8) may generate, for each cluster of the plurality of clusters 108, a network 112 that identifies a time interval to a next interaction that leads to success. Further, the network generator 110 may determine, for each cluster of the plurality of clusters 108 and based on corresponding networks, an estimated time interval to a specified number of conversions.

According to examples disclosed herein, the specified number of conversions may represent a percentage (e.g., 80%) of conversions.

An event sequence analyzer 114 that is executed by at least one hardware processor (e.g., the hardware processor 602 of FIG. 6, and/or the hardware processor 804 of FIG. 8) may ascertain, for the plurality of clusters 108, a success criterion 116 that represents a positive outcome in the estimated time interval. Further, the event sequence analyzer 114 may partition, for each cluster of the plurality of clusters and based on the success criterion 116, a historical sequence of events into a plurality of sequences of events 118 leading to success or failure. According to an example, events may include actions that may be performed to procure a product or service, or to perform a specified task.

A sequence probability analyzer 120 that is executed by at least one hardware processor (e.g., the hardware processor 602 of FIG. 6, and/or the hardware processor 804 of FIG. 8) may analyze, for each cluster of the plurality of clusters, probabilities 122 with respect to the plurality of sequences of events 118.

According to examples disclosed herein, the sequence probability analyzer 120 may determine, for each cluster of the plurality of clusters and for each sequence of events of the plurality of sequences of events 118, a probability of progression of a sequence of events to another sequence of events.

According to examples disclosed herein, the sequence probability analyzer 120 may determine, for each cluster of the plurality of clusters and for each sequence of events of the plurality of sequences of events 118, progressive conditional probabilities of success given a sequence of events.

According to examples disclosed herein, the sequence probability analyzer 120 may simulate, for each cluster of the plurality of clusters and based on the determined probability of progression and the determined progressive conditional probabilities, probabilities of success for propagation of a sequence of events.

A waiting interval analyzer 124 that is executed by at least one hardware processor (e.g., the hardware processor 602 of FIG. 6, and/or the hardware processor 804 of FIG. 8) may determine, for each cluster of the plurality of clusters, a waiting interval 126 of each event of the plurality of sequences of events 118.

According to examples disclosed herein, the waiting interval analyzer 124 may ascertain, for each cluster of the plurality of clusters, a frequency count of all events of the plurality of sequences of events 118 resulting in success. The waiting interval analyzer 124 may ascertain, for each cluster of the plurality of clusters, a frequency contribution of each event of the plurality of sequences of events 118 at a cluster level. Further, the waiting interval analyzer 124 may determine, for each cluster of the plurality of clusters and based on the ascertained frequency count and the ascertained frequency contribution, the waiting interval of each event of the plurality of sequences of events 118.

A frequency contribution analyzer 128 that is executed by at least one hardware processor (e.g., the hardware processor 602 of FIG. 6, and/or the hardware processor 804 of FIG. 8) may determine, for each cluster of the plurality of clusters, frequency contributions 130 of each event of the plurality of sequences of events 118.

According to examples disclosed herein, the frequency contribution analyzer 128 may ascertain, for each cluster of the plurality of clusters, a frequency count of all events of the plurality of sequences of events 118 resulting in success. The frequency contribution analyzer 128 may ascertain, for each cluster of the plurality of clusters, a frequency contribution of each event of the plurality of sequences of events 118 at a cluster level. The frequency contribution analyzer 128 may determine, for each cluster of the plurality of clusters and based on the ascertained frequency count and the ascertained frequency contribution, the frequency contributions 130 of each event of the plurality of sequences of events 118. Further, the frequency contribution analyzer 128 may algorithmically propagate cluster level estimates to determine entity level estimates to thus minimize the overall error of prediction.

According to examples disclosed herein, the frequency contribution analyzer 128 may optimize, for the plurality of entities 106, frequencies from the frequency contributions 130 to maximize a probability of success for a variation in a frequency of events.

A sequence of events mapper 132 that is executed by at least one hardware processor (e.g., the hardware processor 602 of FIG. 6, and/or the hardware processor 804 of FIG. 8) may map, for each cluster of the plurality of clusters and based on the analyzed probabilities 122, the determined waiting interval 126, and the determined frequency contributions 130, the plurality of sequence of events 118.

A journey recommender 134 that is executed by at least one hardware processor (e.g., the hardware processor 602 of FIG. 6, and/or the hardware processor 804 of FIG. 8) may determine, for each cluster of the plurality of clusters and for the mapped plurality of sequence of events 118, whether a mapped sequence of events duration is less than a planned duration. Further, for each cluster of the plurality of clusters, based on a determination that the mapped sequence of events duration is less than the planned duration, the journey recommender 134 may generate a journey 136 that includes the sequence of events 118 for which the mapped sequence of events duration is less than the planned duration, a corresponding frequency, and a corresponding waiting interval.

The journey 136 for one of the clusters may be implemented, for example, to control an intelligent machine, shown as a device 138, which may execute the journey 136 that includes a sequence of events to be implemented by the device 138, a waiting time (interval) between two events, and a frequency of implementation of the events. The events specified in the journey 136 and implemented by the device 138 may thus provide a fully automated system that operates without any human intervention.

Yet further, the device 138 may be pre-configured to perform a pre-specified set of operations. In this regard, the journey 136 may specify operations that include a sequence of events to be implemented by the device 138, a waiting time (interval) between two events, and a frequency of implementation of the events that increases efficiency of operation of the device 138, compared to an efficiency associated with performance of the pre-specified set of operations. For example, since the journey recommender 134 generates the journey 136 that includes the sequence of events 118 for which the mapped sequence of events duration is less than the planned duration (where the planned duration may be less than or equal to a duration associated with performance of the pre-specified set of operations), the journey 136 may specify operations that include a sequence of events to be implemented by the device 138 that increases efficiency of operation of the device 138, compared to an efficiency associated with performance of the pre-specified set of operations.

Operation of the apparatus 100 is described in further detail with reference to FIGS. 1-6.

Figure 2:
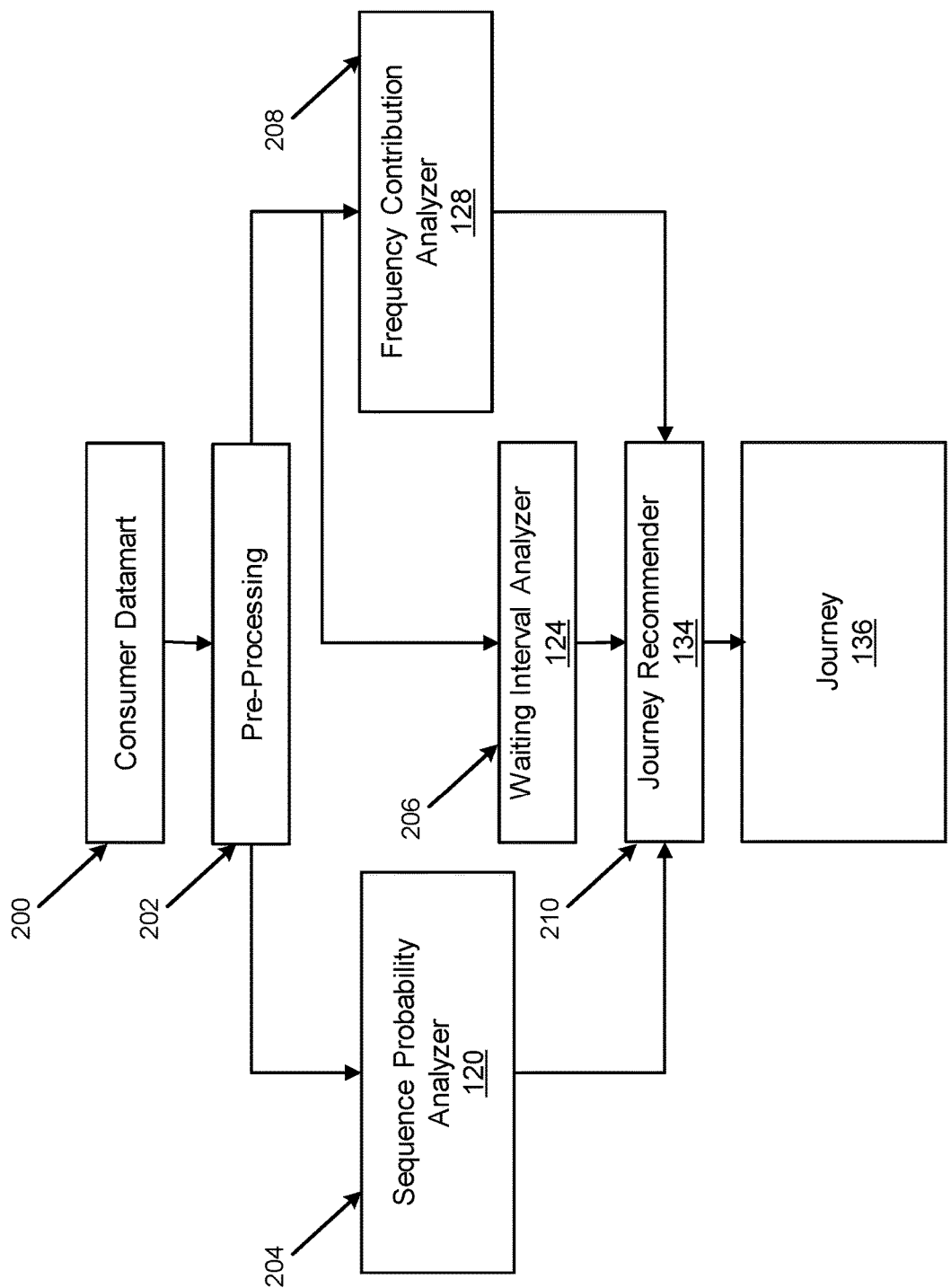
FIG. 2 illustrates a high-level logical flow to illustrate operation of the sequence, frequency, and time interval based journey recommendation apparatus of FIG. 1 in accordance with an example of the present disclosure.

FIG. 2 illustrates a high-level logical flow to illustrate operation of the apparatus 100 in accordance with an example of the present disclosure.

Referring to FIG. 2, at 200, the consumer datamart may include a history associated with entities 106 and associated attributes 104.

At 202, the pre-processing may include some of the operations performed by the entity attribute analyzer 102, the network generator 110, and the event sequence analyzer 114 as disclosed herein with respect to FIG. 1.

The operations at 204, 206, and 208 may be respectively performed by the sequence probability analyzer 120, the waiting interval analyzer 124, and the frequency contribution analyzer 128 as disclosed herein with respect to FIG. 1.

The operation at 210 may be performed by the journey recommender 134 as disclosed herein with respect to FIG. 1.

Figure 3A:
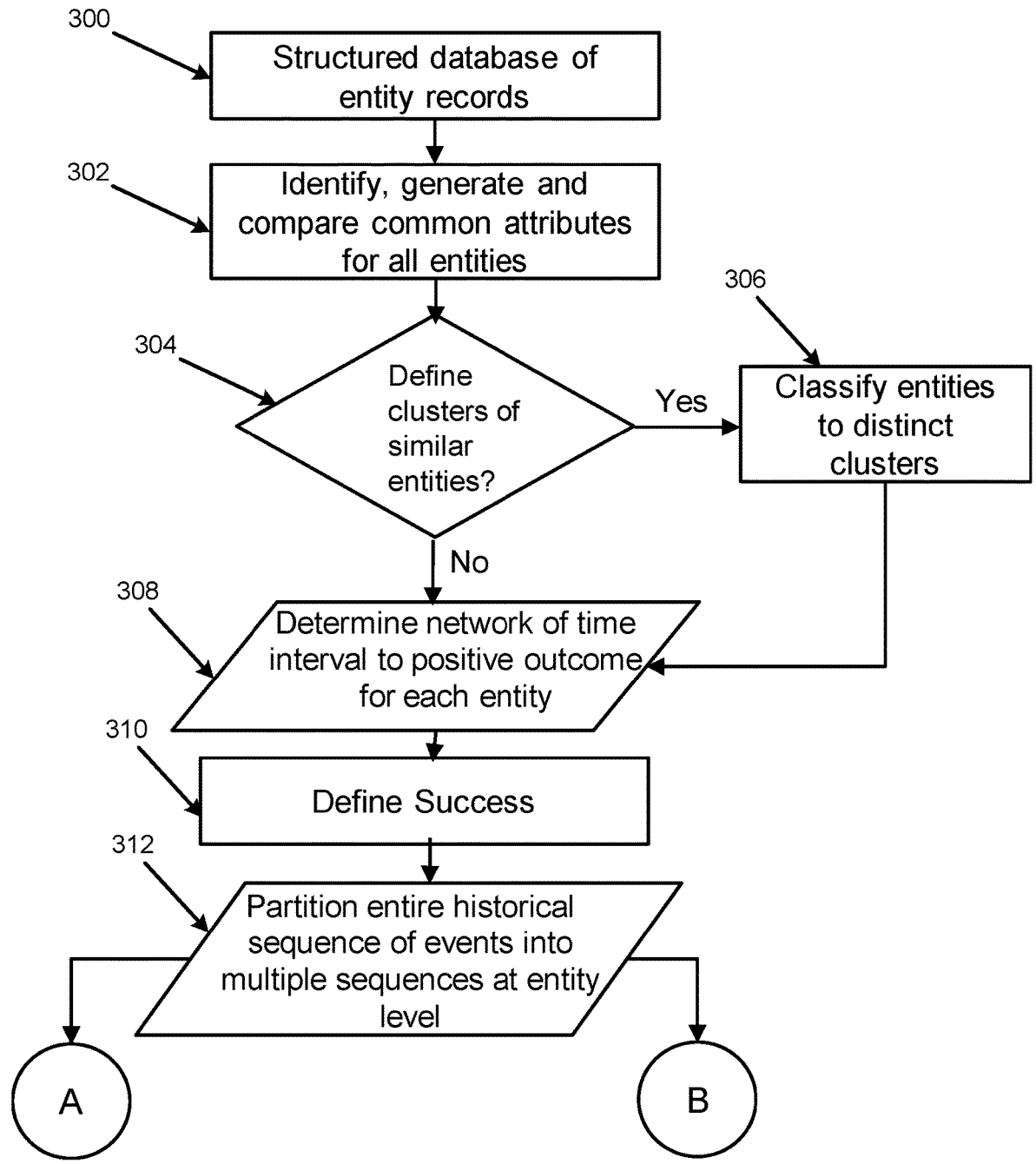
FIG. 3A illustrates a data analysis flow of the high-level logical flow of FIG. 2 to illustrate operation of the sequence, frequency, and time interval based journey recommendation apparatus of FIG. 1 in accordance with an example of the present disclosure.

FIG. 3A illustrates a data analysis flow of the high-level logical flow of FIG. 2 to illustrate operation of the apparatus 100 in accordance with an example of the present disclosure.

Referring to FIG. 3A, at 300, a structured database of entity records may be received, for example, by the entity attribute analyzer 102. In this regard, according to an example, an entity may refer, for example, to customers across any industry who have been exposed to advertising and/or marketing for a product to generate its sales. In this example, the database may contain marketing and sales information specific to an entity, and may further include associated time stamps.

At 302, the entity attribute analyzer 102 may identify, generate, and compare common attributes for all entities. For the example of FIG. 3, the attributes may include administered marketing, generated sales, product preferences, etc. for each entity.

At 304, the entity attribute analyzer 102 may analyze the variations in determined attributes across entities, and determine whether to generate and analyze different clusters of entities, or to form a complete overall cluster of entities.

Based on a determination at 304 to define clusters of similar entities, at 306, the entity attribute analyzer 102 may classify entities into distinct clusters.

Alternatively, based on a determination at 304 to not define clusters of similar entities, at 308, the network generator 110 may determine a network of time interval (e.g., one week, five minutes, etc.) to a positive outcome for each entity. In this regard, the network generator 110 may generate a network 112 (or a decision tree) with a time interval to a next interaction that leads to success. The nodes of the network may be solved to determine the expected time interval, for example, to 80% of the conversions.

At 310, the event sequence analyzer 114 may ascertain a success criterion 116 that refers to a positive outcome in the estimated time interval. The success criterion 116 may vary across industry for the involved entities.

At 312, the event sequence analyzer 114 may partition, based on the success criterion 116, historical sequence of events into multiple sequences of events 118 at the entity level. In this regard, the event sequence analyzer 114 may partition, based on the success criterion 116, historical sequence of events into multiple sequences of events 118 leading to success or failure using, for example, time interval to sales (e.g., for the example of FIG. 3).

Figure 3B:
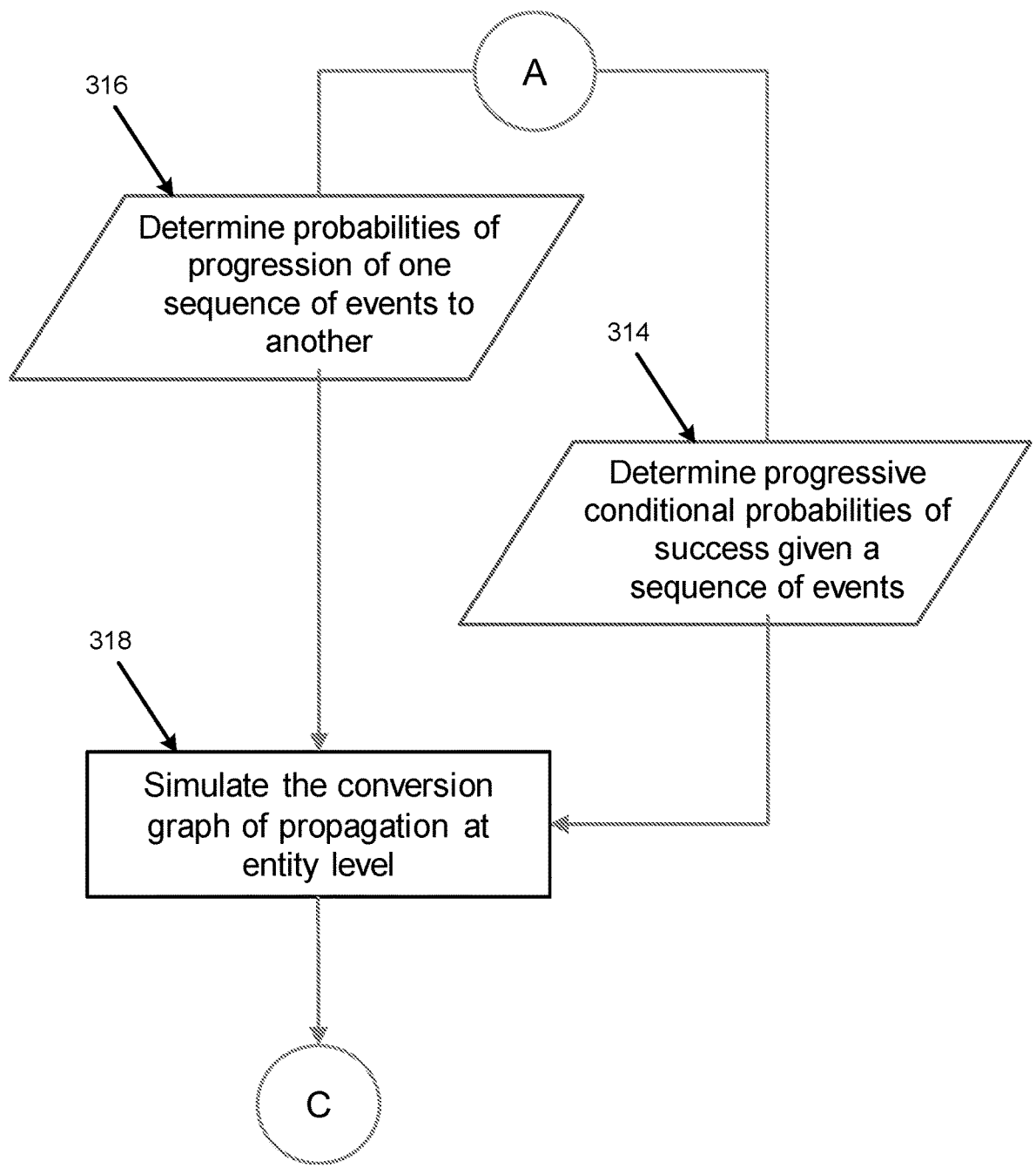
FIG. 3B illustrates a sequence of events determination flow of the high-level logical flow of FIG. 2 to illustrate operation of the sequence, frequency, and time interval based journey recommendation apparatus of FIG. 1 in accordance with an example of the present disclosure.

FIG. 3B illustrates a sequence of events determination flow of the high-level logical flow of FIG. 2 to illustrate operation of the apparatus 100 in accordance with an example of the present disclosure.

Referring to FIG. 3B, at 314, the sequence probability analyzer 120 may determine progressive conditional probabilities of success given a sequence of events. In this regard, the sequence probability analyzer 120 may determine a probability of progressing sequence of events leading to success. According to examples disclosed herein, with respect to determination of progressive conditional probabilities of success given a sequence of events, let $X_{(j,n)}$ represent the $j^{th}$ sequence of n events as:

$$X_{(j,n)} = \{E(P_1) = x_1\} < \{E(P_2) = x_2\} < \ldots < \{E(P_{n-1}) = x_{n-1}\} < \{E(P_n) = x_n\} \quad \text{Equation (1)}$$

For Equation (1), $E(P_i)$ represents the $i^{th}$ event (e.g., promo/marketing tactic) where i=1,2,3, ... m, where $x_n$ represents the $n^{th}$ event, and $x_{n-1}$ represents the $(n-1)^{th}$ event. Further, the progressive conditional probabilities of success given a sequence of events may be determined as:

$$P(S/X_{(j,n)})(x_1, x_2, \ldots x_n) \quad \text{Equation (2)}$$

Equation (2) may represent the conditional probability of success given $X_{(j,n)}{}^{th}$ sequence of events, where S represents success (e.g., conversion).

At 316, the sequence probability analyzer 120 may determine probabilities of progression of one sequence of events to another sequence of events. In this regard, the sequence probability analyzer 120 may determine a probability of a sequence of events not leading to success, but to another sequence of events. According to examples disclosed herein, the probabilities of progression of one sequence of events to another sequence of events may be determined as:

$$Z_{(n)} = Z_{(n-1)} + \{(1 - P(S/X_{(j,n-1)}(x_1, x_2, \ldots x_{n-1}))^* \\ (\Delta Z_{(n-1)}/P(S/X_{(j,n-1)}(x_1, x_2, \ldots x_{n-1}))^* \\ \max(w_n^* P(S/X_{(j,n)}(x_1, x_2, \ldots x_n)), w_{n-1}^* P(S/X_{(j,n-1)}(x_2, \ldots x_n)) \\ \ldots \\ w_2^* P(S/X_{(j,2)}(x_{n-1}, x_n)), w_1^* P(S/X_{(j,1)}(x_n)))\} \quad \text{Equation (3)}$$

For Equation (3), $\Delta Z_{(n-1)}$ represents the uplift in conversion from (n-2) sequence of events to (n-1) and $Z_{(1)} = P(S/X_{j,1)(x1)})$. Further, $w_i$ represents weight based on $i^{th}$ sequence of recent of events $\{w_n > w_{n-1} > \ldots w_2 > w_1$ and $\Sigma w_i = 1\}$.

At 318, the sequence probability analyzer 120 may simulate a conversion graph of propagation at entity level. In this regard, the sequence probability analyzer 120 may simulate the probabilities of success for various propagation of sequence of events.

Figure 3C:
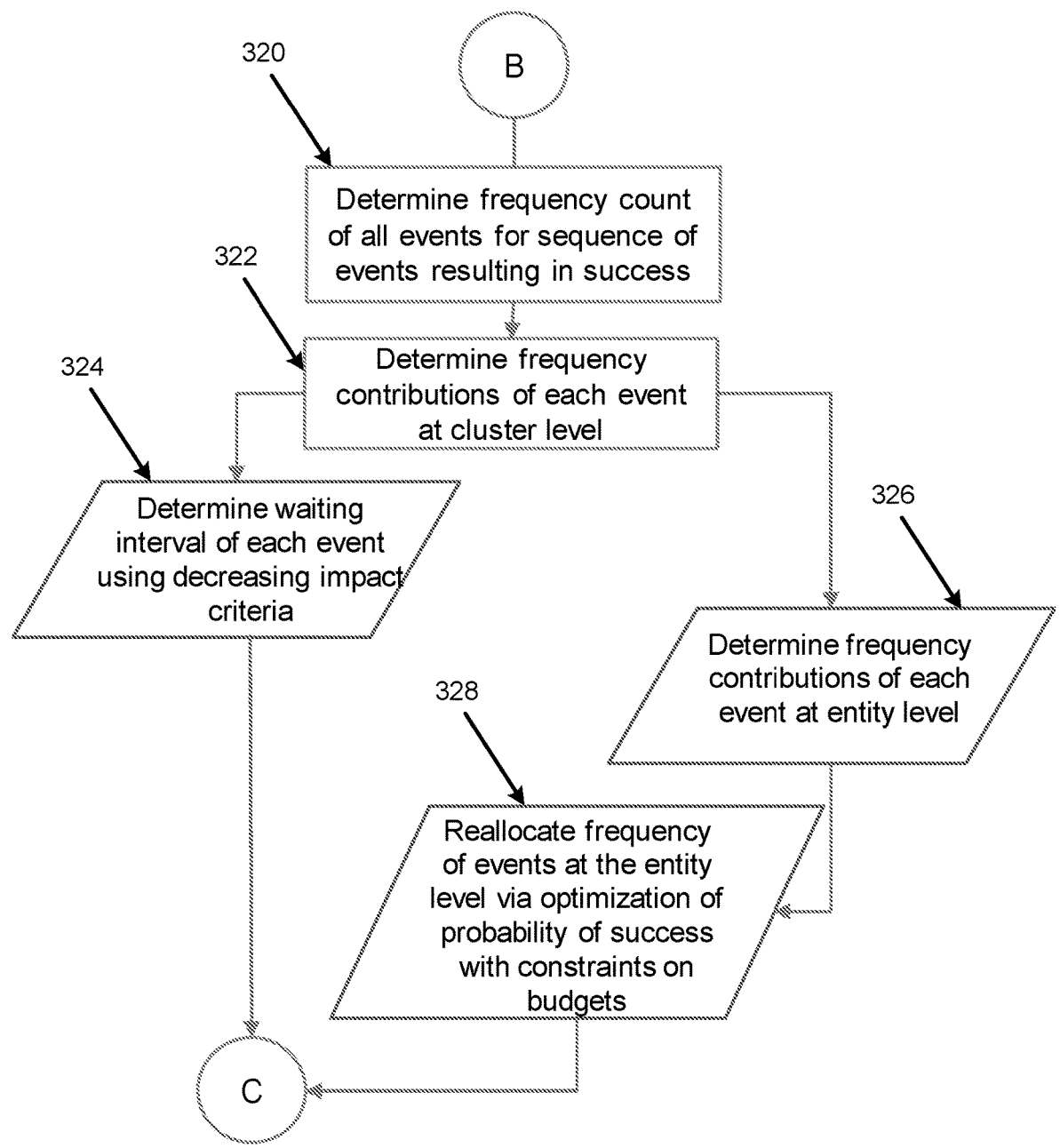
FIG. 3C illustrates a waiting interval and frequency determination flow of the high-level logical flow of FIG. 2 to illustrate operation of the sequence, frequency, and time interval based journey recommendation apparatus of FIG. 1 in accordance with an example of the present disclosure.

FIG. 3C illustrates a waiting interval and frequency determination flow of the high-level logical flow of FIG. 2 to illustrate operation of the apparatus 100 in accordance with an example of the present disclosure.

Referring to FIG. 3C, at 320, the waiting interval analyzer 124 and the frequency contribution analyzer 128 may determine a frequency count of all events for a sequence of events resulting in success. In this regard, a sequence of events leading to success may contain a subset of events or repeated events.

At 322, the waiting interval analyzer 124 and the frequency contribution analyzer 128 may determine frequency contributions of each event at a cluster level. In this regard, according to an example, regressing frequency of events may lead to observed sales resulting in their respective contribution to sales. With respect to determining frequency contributions of each event at a cluster level, a regression model may be fitted for the response variable of each cluster as follows:

$$Y_t = \text{Base}_t + \beta_1 {}^* X_{1t} + \beta_2 {}^* X_{2t} + \ldots + \beta_n {}^* X_{nt} \quad \text{Equation (4)}$$

For Equation (4), $Y_t$ represents the number of conversions, $X_i$ represents $i^{th}$ event at cluster level tested for various statistical transformations, and $\beta_i$ represents the coefficient corresponding to $i^{th}$ event estimated through a machine learning model that may evaluate the impact of all the explanatory variables $X_{1t} \ldots X_{nt}$ on the total conversions. The machine learning model may estimate the parameters while minimizing the prediction error, and converges when the cost function (Equation (4)) cannot be further optimized.

At 324, the waiting interval analyzer 124 may determine a waiting interval of each event using a decreasing impact criteria. In this regard, according to an example, a waiting interval may refer to an observed time of sales once an event is triggered. A different waiting interval may be determined for each cluster. With respect to determination of a waiting interval of each event using a decreasing impact criteria, an interval of time corresponding to an event beyond which an impact of the event wears off may be determined as follows:

$$\eta = \frac{\ln(0.5)}{\ln(\mu)} \quad \text{Equation (5)}$$

For Equation (5), $\mu$ represents a decreasing impact constant. Further, the frequency thresholds for events at an entity level may be obtained by optimizing the response function based on given restraints:

Objective function:

$$\text{Maximize}(\Sigma \beta_i X_i^{b_i})$$

Subject to,
(i) $e_i < X_i < f_i$ for i=1,2, ... n, where, $e_i$ and $f_i$ are lower and upper frequency bound respectively
(ii) $\Sigma X_i \leq m$, where m is the maximum number of events to be administered to an entity for the given duration of the journey.

At 326, the frequency contribution analyzer 128 may determine frequency contributions 130 of each event at an entity level. In this regard, the frequency contribution analyzer 128 may algorithmically propagate cluster level estimates to arrive at entity level estimates to thus minimize the overall error of prediction. With respect to determining frequency contributions of each event at an entity level, cluster level estimates may be algorithmically propagated to arrive at entity level estimates minimizing the overall error of prediction using, for example, a batch descent method as follows:

$$\text{Error of prediction, } h(\beta) = \Sigma (Y_t - f_\beta(x_t))^2 \quad \text{Equation (6)}$$

For Equation (6), $f_\beta(x_t)$ may represent the predicted response. Thereafter, $h(\beta)$ may be minimized using the following:

$$\beta = \beta - \gamma \Delta h(\beta) \quad \text{Equation (7)}$$

For Equation (7), $\beta$'s may be within their respective lower and upper bound.

At 328, the frequency contribution analyzer 128 may reallocate frequency of events at the entity level by optimization of probability of success, for example, with constraints on budgets. In this regard, the frequency contribution analyzer 128 may optimize frequency to maximize the probability of success at an entity level for a given variation in frequency of events at a cluster level.

Figure 3D:
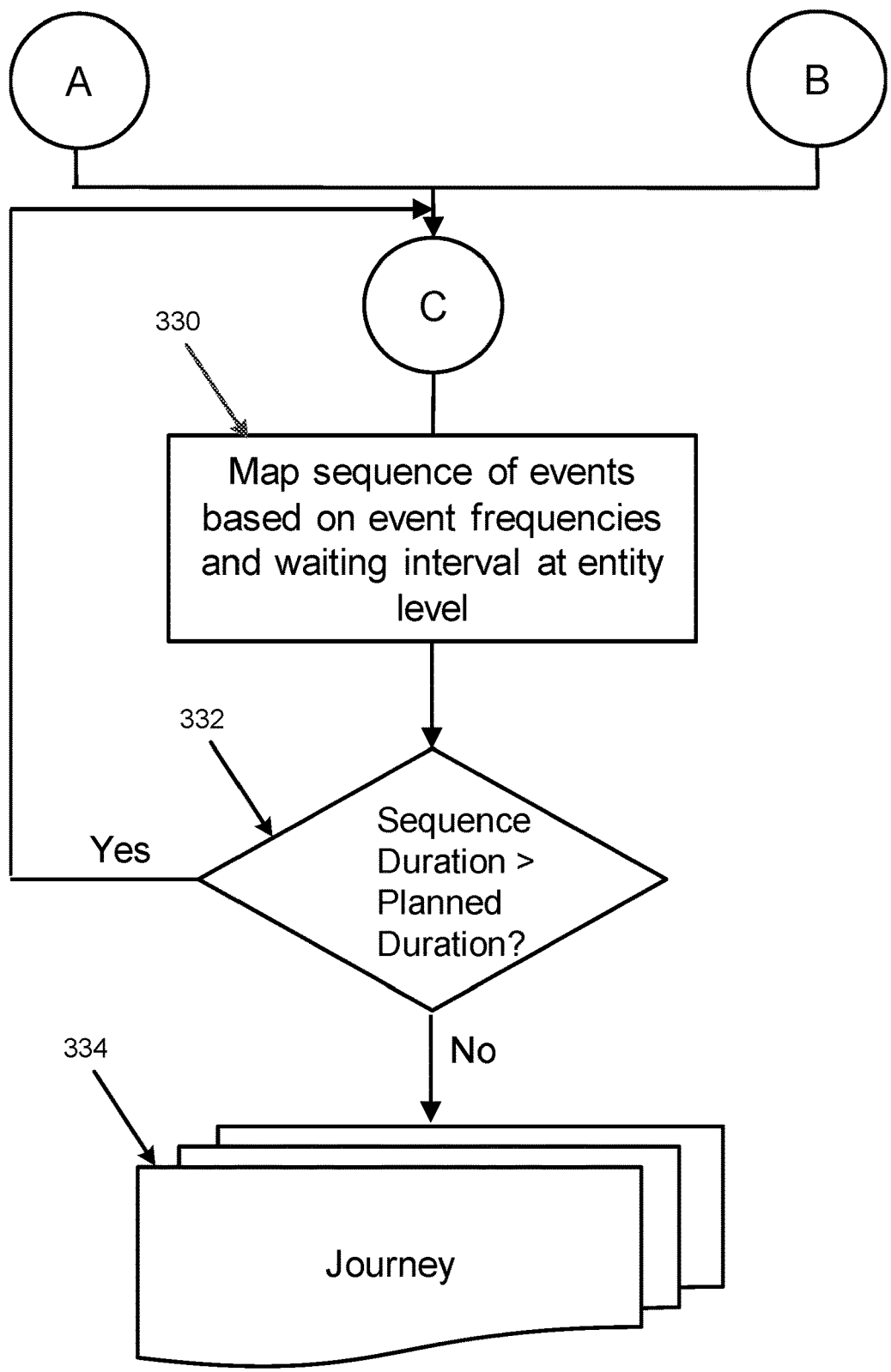
FIG. 3D illustrates a journey determination flow of the high-level logical flow of FIG. 2 to illustrate operation of the sequence, frequency, and time interval based journey recommendation apparatus of FIG. 1 in accordance with an example of the present disclosure.

FIG. 3D illustrates a journey determination flow of the high-level logical flow of FIG. 2 to illustrate operation of the apparatus 100 in accordance with an example of the present disclosure.

Referring to FIG. 3D, at 330, the sequence of events mapper 132 may map a sequence of events based on event frequencies and waiting interval at an entity level. In this regard, the sequence of events mapper 132 may filter simulated sequence of events for the observed frequency and waiting time of events for each entity.

At 332, the journey recommender 134 may determine whether a sequence duration is greater than a plan duration. In this regard, according to an example, based on the time interval to sales for each entity, the journey recommender 134 may determine to retain the generated sequence.

At 334, based on a determination at 332 that the sequence duration is less than the plan duration, the journey recommender 134 may generate a final recommendation of a journey that includes a specified sequence of events. In this regard, the journey may include an optimal sequence, frequency, and waiting interval of events for each entity.

Figure 4:
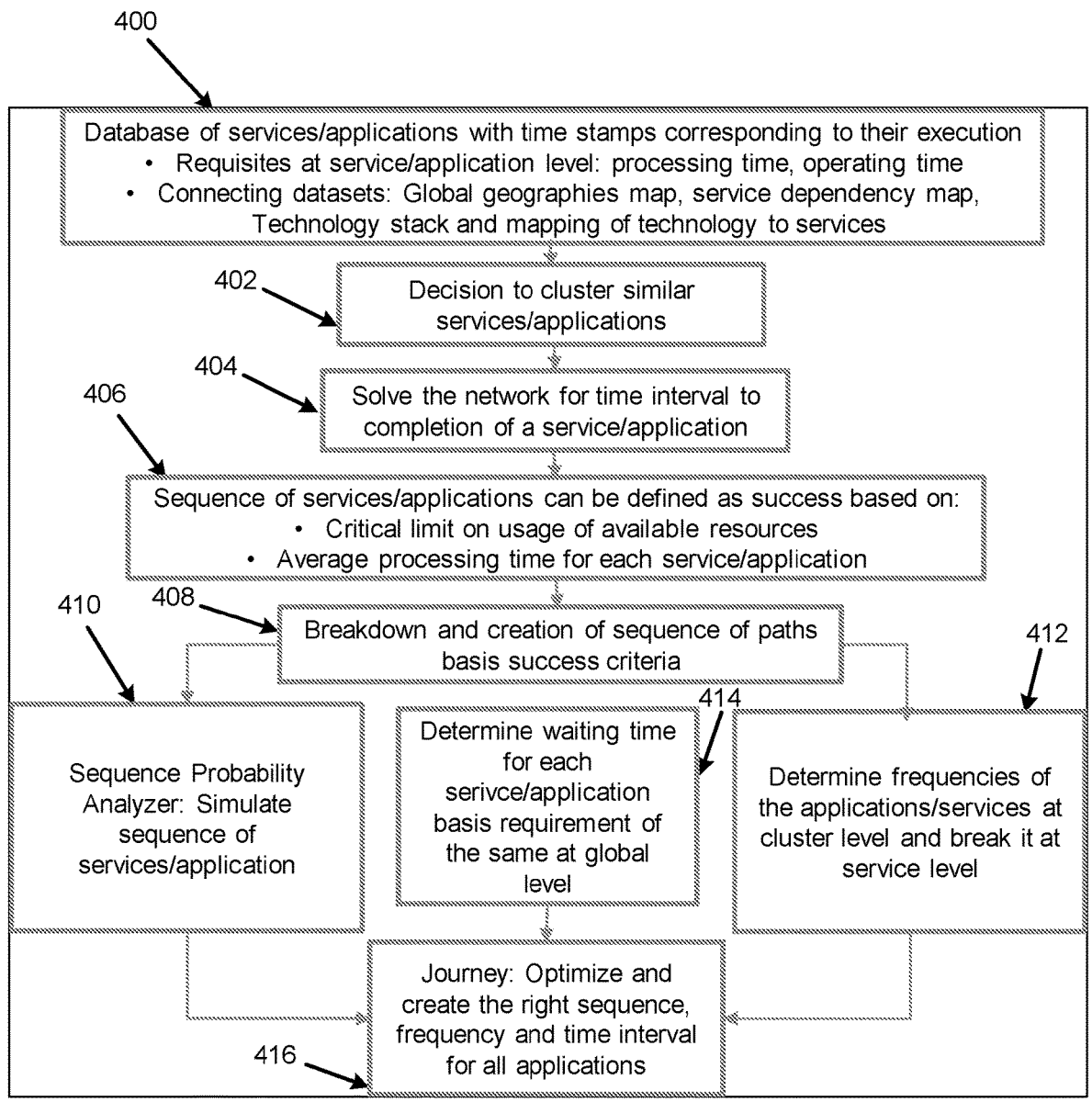
FIG. 4 illustrates an example of global management of information technology services to illustrate operation of the sequence, frequency, and time interval based journey recommendation apparatus of FIG. 1 in accordance with an example of the present disclosure.

FIG. 4 illustrates an example of global management of information technology services to illustrate operation of the apparatus 100 in accordance with an example of the present disclosure.

Referring to FIG. 4, with respect to global management of information technology services, such services for relatively large organizations may include management of applications and processes that are performed around the clock, and are spread out over various geographies. Such services may be managed locally, and on general parameters. On a global scale, management of such services may include determination of a proper sequence, frequency of maintenance/operations, and also waiting times between services. In this regard, the apparatus 100 may generate the journey 136 that defines the correct sequence of operations, frequency of operations, and waiting time to map dependencies between operations.

For example, referring to FIG. 3A and 4, at block 400, with respect to block 300 of FIG. 3A, entity may refer to information technology systems/servers across geographies. The database may refer to record of, the run of sequence of applications, and jobs/processes for all servers across geographies with a corresponding time stamp. Other relevant information that may be included in a structured database of entity records may include a record of resource usage for the history that is considered, a jobs/processes 'run (e.g., execution) schedule, service level agreements per application and jobs/processes, and execution time per application and jobs/processes.

Referring to block 402, with respect to block 302 of FIG. 3A, attributes such as resource availability and resource usage per application and jobs/processes may be identified for each entity (e.g., server).

Referring again to block 402, with respect to block 304 of FIG. 3A, the decision to cluster the entities (e.g., servers) may be based, for example, on similar resource availability, and/or similar pattern/trend of resource usage (e.g., geographical clusters). Clustering may be more feasible when there are many entities with significantly varying levels of attributes (or varying characteristics). There may be any number of clusters based on different levels of the two specified attributes mentioned in the information technology example of FIG. 4 (e.g., resource availability and resource usage per application and jobs/processes).

Referring to block 404, with respect to block 308 of FIG. 3A, the time interval may represent a time interval needed to execute the workflow of jobs/processes over the entire history maintaining the productivity level and service level agreements. With respect to time interval determination, for example, historically, a patch update may take, 8 hours to 20 hours to complete, and using the network (e.g., decision tree) based approach disclosed herein, an interval of 12 hours time may be determined leading to a most successful completion of workflow for a cluster. In this regard, the network generator 110 may generate a network 112 (or a decision tree) with a time interval to a next interaction that leads to success. The nodes of the network may be solved to determine the expected (e.g., estimated) time interval, for example, to 80% of the conversions, where the conversions percentage may be determined as the ratio of total successful workflow completion to the total workflow completion for that cluster of entities. According to an example, a different expected time interval may be determined for each cluster.

Referring to block 406, with respect to block 310 of FIG. 3A, the success criterion 116 may be specified such that a run of jobs/processes (during the day to day run of applications) may be a success if, for example, central processing unit usage and productivity across servers are maintained, for example, at 75%, or adhere to the service level agreement. The success criteria may indicate a benchmark proportion which can be utilized for all clusters.

Referring to block 408, with respect to block 312 of FIG. 3A, historical schedules of jobs/processes may be partitioned for the estimated time interval, and may be marked as success or failure based on the success criterion 116. In this regard, the event sequence analyzer 114 may partition, based on the success criterion 116, historical sequence of events into multiple sequences of events 118 at the entity level. For example, a workflow may require a patch update on 1000 machines over a window of 12 hours. Historically, this type of patch update may take in the range of 8 hours to 20 hours. However, this historical journey may be divided into 12-hour journeys of which some will result in success and other in failures.

Referring to block 410, with respect to block 314 of FIG. 3B, the progressive conditional probabilities of success given a sequence of events may be determined as a probability of progression for a successful run of a workflow of jobs/processes. With respect to determination of progressive conditional probabilities of success given a sequence of events, a workflow of a patch update may be divided into small events executed in a sequence. For each event that occurred, the probability of success may be determined, and for subsequent events, a probability, which is conditional of the previously occurred event, may be determined. With respect to different clusters, progressive conditional probabilities of success may be determined for each cluster.

Referring again to block 410, with respect to block 316 of FIG. 3B, the probabilities of progression of one sequence of events to another sequence of events may be determined as a probability of a successful job/process leading to another successful job/process for the underlying resource availability for that time interval. With respect to determination of probabilities of progression of one sequence of events to another sequence of events, not all sequence of events may result into the successful completion of the workflow. This intermediate step may also determine a probability of introducing another event which increases the chances of successful completion of the workflow in the stipulated time period. With respect to different clusters, probabilities of progression of one sequence of events to another sequence of events may be determined for each cluster.

Referring again to block 410, with respect to block 318 of FIG. 3B, with respect to simulating the conversion graph of propagation at entity level, the sequence of different jobs/processes may be simulated in the estimated time period for varying levels of resource usage taking into account various interdependencies. With respect to simulation of the conversion graph of propagation at entity level, every entity within a cluster may be at a different point in the journey, and may be governed by the rules applicable to the cluster. Hence, by using cluster level recommendation and entity level inputs, an entity level recommendation may be generated.

Referring to block 412, with respect to block 320 of FIG. 3C, the frequency count of different jobs/processes which have been run in the estimated time interval in parallel may be created. In this regard, the frequency of applications that may be run in parallel may be estimated. For example, if at a time for a patch update, n applications are run in parallel, then those 'n' applications may be bundled together as one unit and their frequency may be counted as one while any other observed combination of applications with frequency other than 'n' may be marked as zero. Moreover, given the adherence of resource usage to a benchmark success criteria, the process may be marked as success or failure. With respect to different clusters, the frequency estimation may be determined for each cluster.

Referring again to block 412, with respect to block 322 of FIG. 3C, the estimates with respect to different jobs/processes may be determined for effective frequency count at cluster level. A machine learning model may be applied to evaluate the impact of all of the explanatory variables $X_{1t} \ldots X_{nt}$ (where $X_s$ represents the frequency count with respect to a unit) on the total of successful execution of a patch update. The machine learning model may estimate the parameters while minimizing the prediction error, and may converge when the cost function cannot be further optimized.

Referring again to block 412, with respect to block 326 of FIG. 3C, cluster level estimates may be algorithmically propagated to arrive at entity level estimates minimizing the overall error of prediction. In this regard, by using cluster level estimates as entity level inputs, entity level (e.g., server level) estimates may be generated. Even though similar entities may form a cluster, individual servers may have a very different trend of resource usage due to which server level frequency estimates may vary over a range of the estimated cluster level frequency estimate. The most significant value of the entity level estimate may then be selected (e.g., see Equations (6) and (7)).

Referring again to block 412, with respect to block 328 of FIG. 3C, the frequency may be optimized to maximize the probability of success at entity level. In this regard, for the entity level estimates, the overall contribution to success at entity level may be maximized based on a few constraints.

Referring to blocks 412 and 414, with respect to block 324 of FIG. 3C, the waiting interval may refer to observed time between the execution of different jobs/processes. In this regard, the waiting time may be determined based on resource usage and average execution time for an application, as well as resource usage during run time. Different applications may include a different execution time, which may vary over minutes, hours, days, and/or weeks.

Referring to block 416, with respect to block 330 of FIG. 3D, a simulated sequence of jobs/processes may be filtered for the observed frequency and waiting time of jobs/processes for each entity. In this regard, all combinations of jobs/processes may be simulated, and only those combinations are retained which adhere to the estimated frequency count and waiting time of the applications within those jobs/processes. For example, a few of the simulated sequence of applications for a patch update may have more than the estimated optimal number of applications running parallel at a given time, and these may need to be filtered out.

Referring again to block 416, with respect to block 332 of FIG. 3D, a determination may be made as to whether the sequence is feasible and meets the success criterion 116. In this regard, with respect to a sequence that is feasible and meets the success criterion 116 may include when a type of patch update does not exceed, for example, 75% benchmark CPU usage at any given time and satisfy the service level agreements.

Referring again to block 416, with respect to block 334 of FIG. 3D, a resulting journey 136 may include an optimal sequence, frequency and waiting interval of jobs/entity for each entity (e.g., server). An example of a resulting journey 136 that may include an optimal sequence, frequency and waiting interval of jobs/entity for each entity may include a sequence of applications in a patch update.

Figure 5:
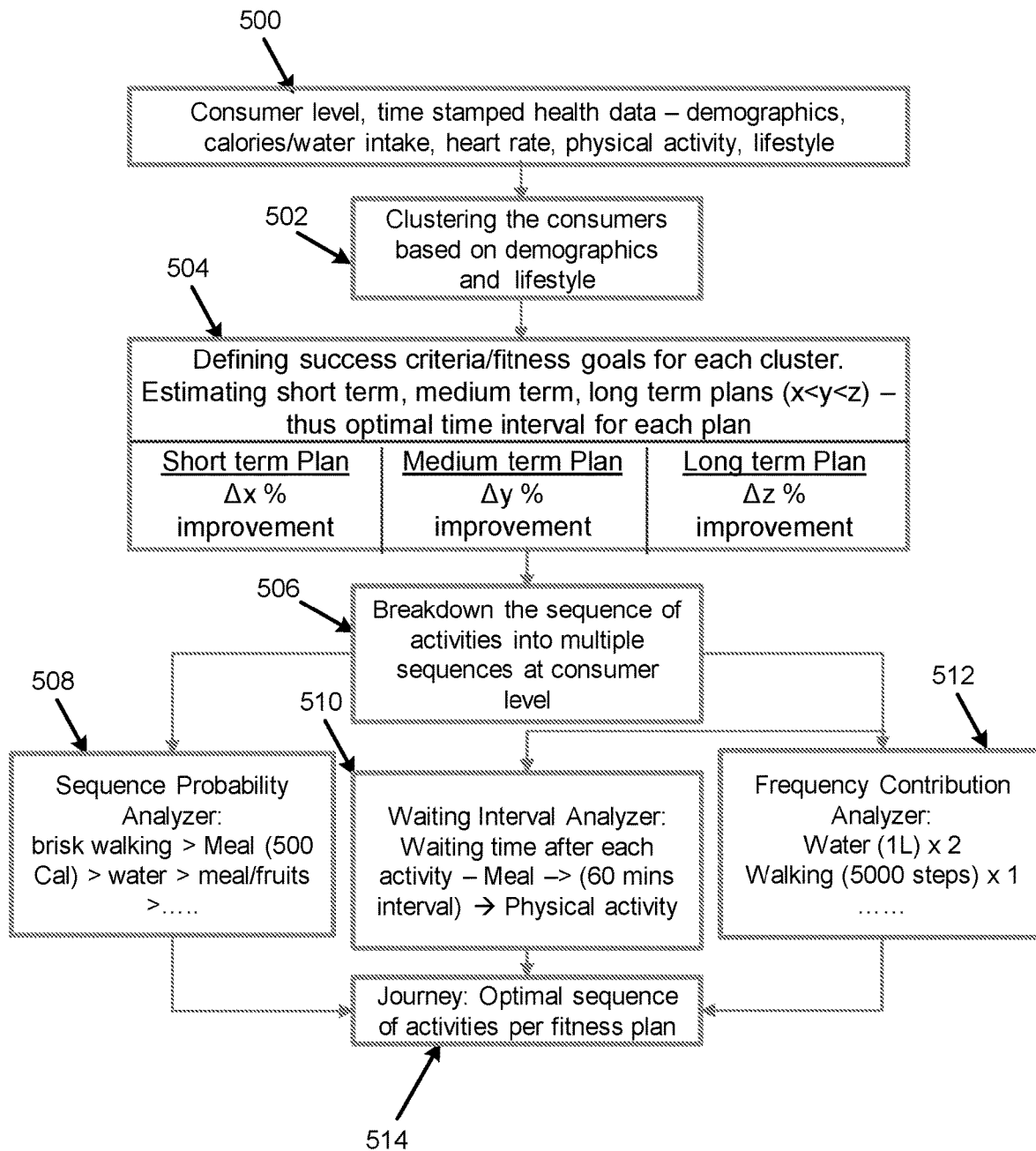
FIG. 5 illustrates an example of optimal fitness plan determination in healthcare to illustrate operation of the sequence, frequency, and time interval based journey recommendation apparatus of FIG. 1 in accordance with an example of the present disclosure.

FIG. 5 illustrates an example of optimal fitness plan determination in healthcare to illustrate operation of the apparatus 100 in accordance with an example of the present disclosure.

Referring to FIG. 5, the processing at blocks 500, 502, 504, 506, 508, 510, 512, and 514 may be similar to the processing at blocks 400, 402, 406, 408, 410, 414, 412, and 416 of FIG. 4.

For example, at block 500, data that is analyzed may include consumer level, timestamp health data that includes demographics, calories/water intake, heart rate, physical activity, lifestyle, etc.

At block 502, clustering of entities (e.g., consumers) may be based on demographics and lifestyle.

At block 504, a success criteria and fitness goal may be defined for each cluster generated at block 502.

At block 506, the sequence of activities may be partitioned into multiple sequences at the entity (e.g., consumer level).

At block 508, the sequence probability analyzer 120 may analyze probabilities 122 with respect to the plurality of sequences of events 118 determined at block 506.

At block 510, the waiting interval analyzer 124 may determine a waiting interval 126 of each event of the plurality of sequences of events 118.

At block 512, the frequency contribution analyzer 128 may determine frequency contributions 130 of each event of the plurality of sequences of events 118.

At block 514, the journey recommender 134 may generate a journey 136 that includes an optimal sequence of events 118, a corresponding frequency, and a corresponding waiting interval.

Figure 6:
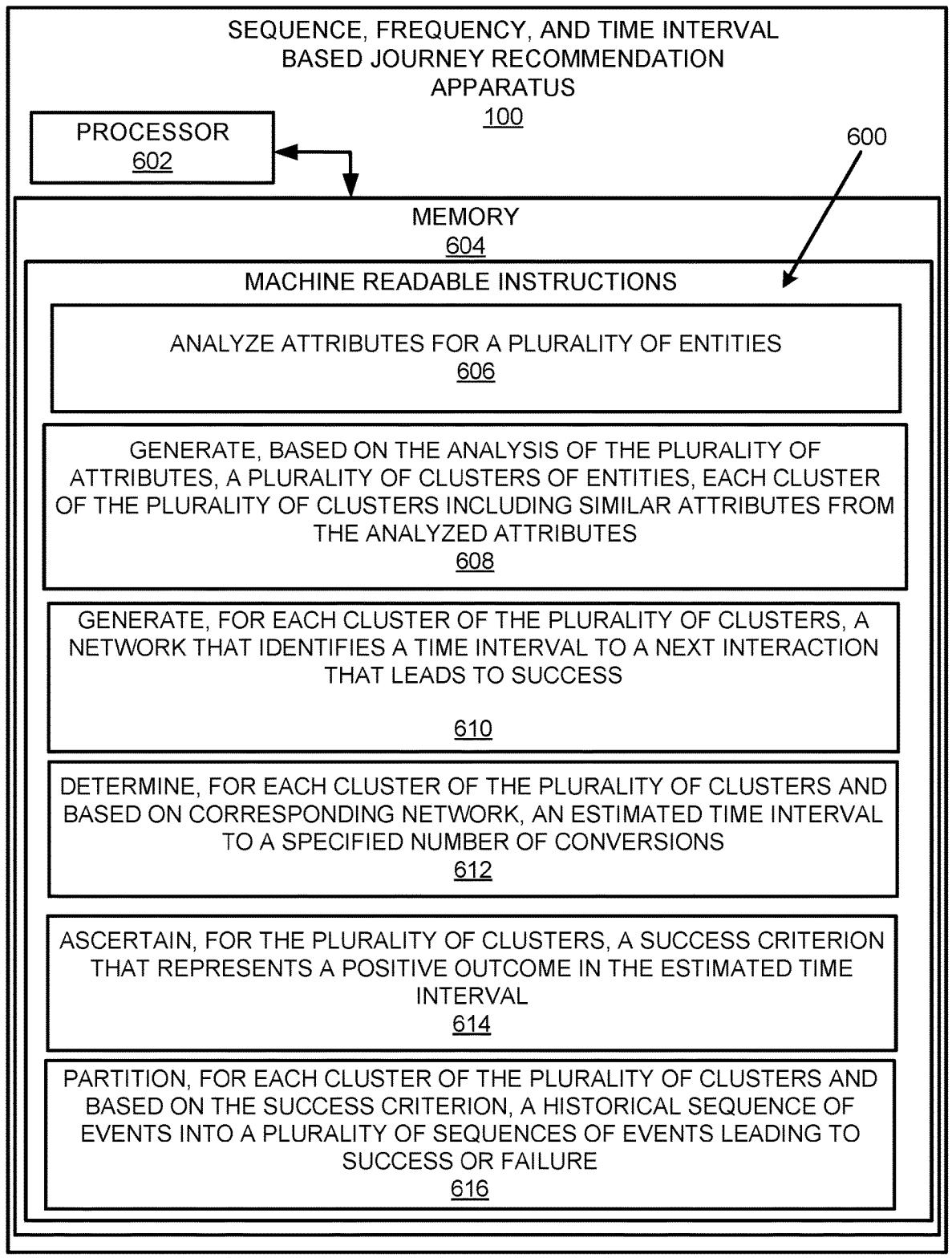
FIG. 6 illustrates an example block diagram for sequence, frequency, and time interval based journey recommendation in accordance with an example of the present disclosure.
Figure 6:
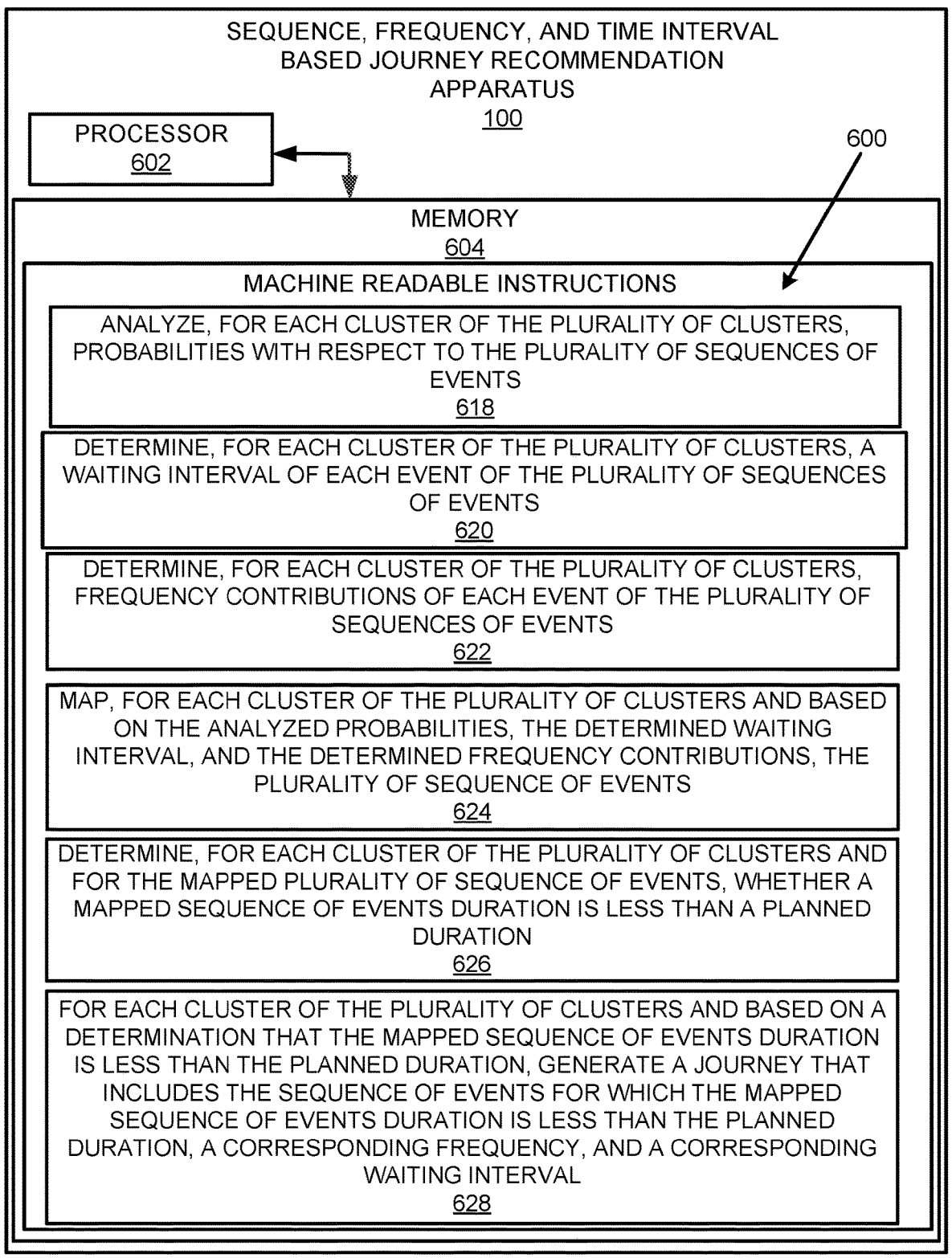
Figure 7:
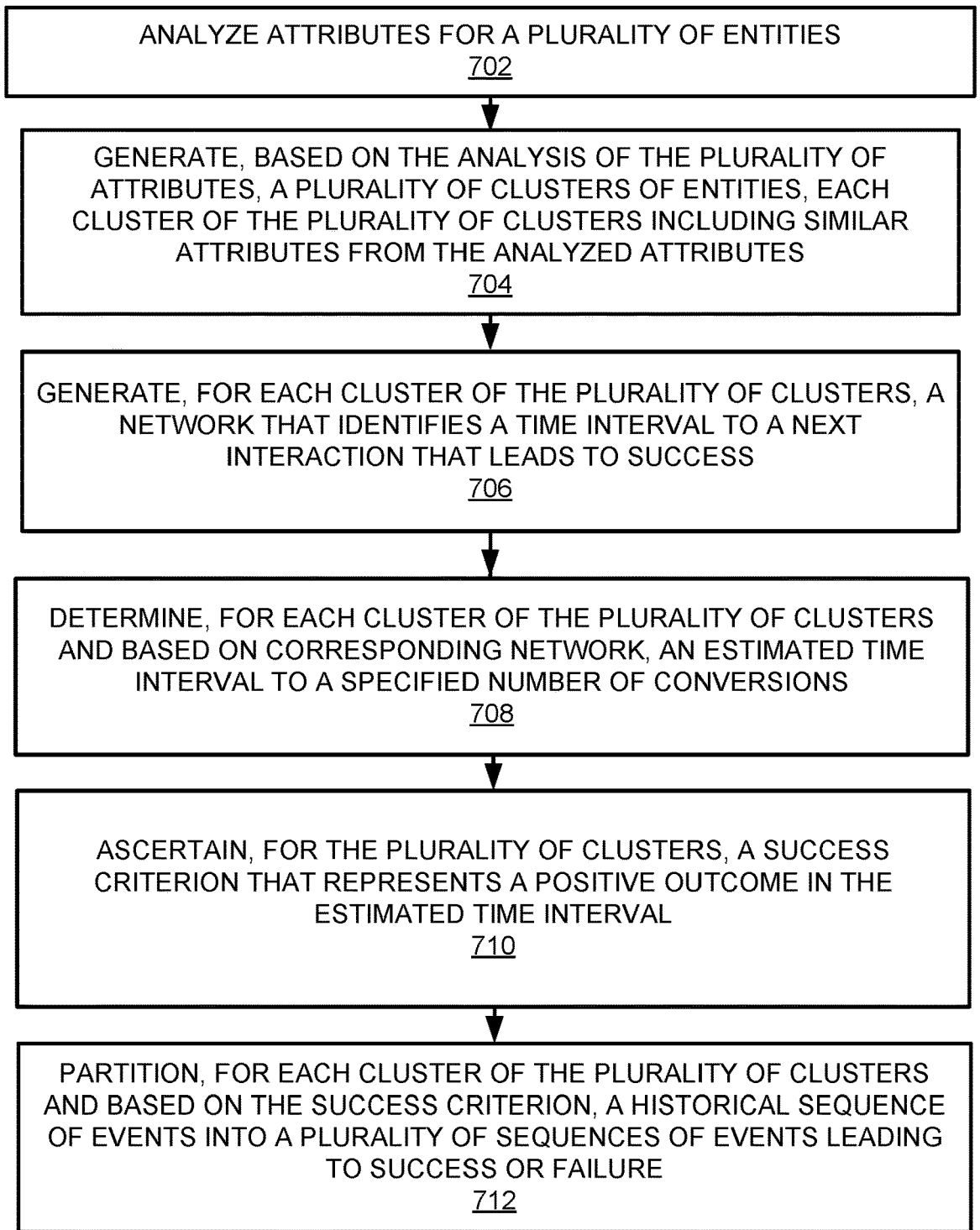
FIG. 7 illustrates a flowchart of an example method for sequence, frequency, and time interval based journey recommendation in accordance with an example of the present disclosure.
Figure 7:
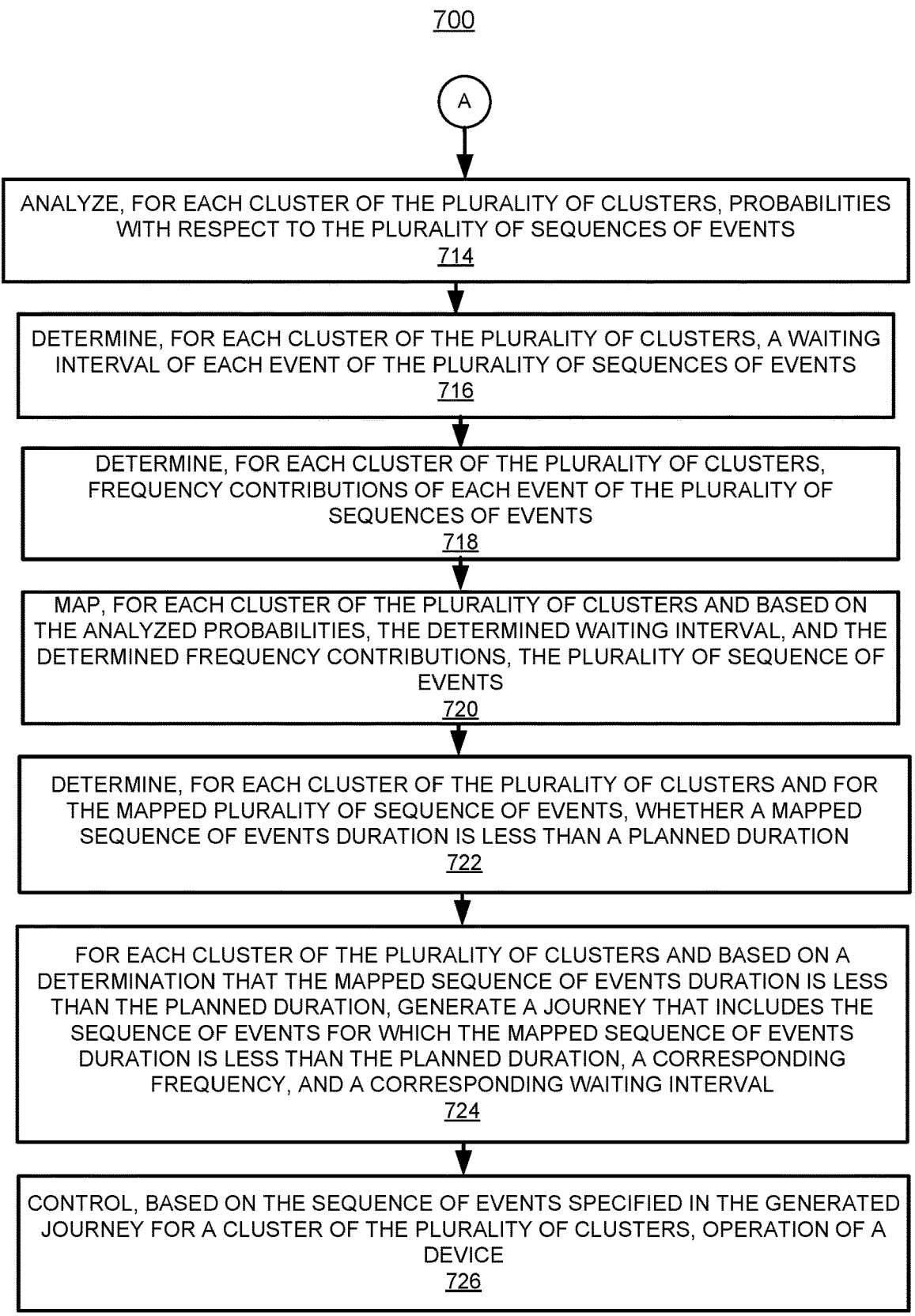
Figure 8:
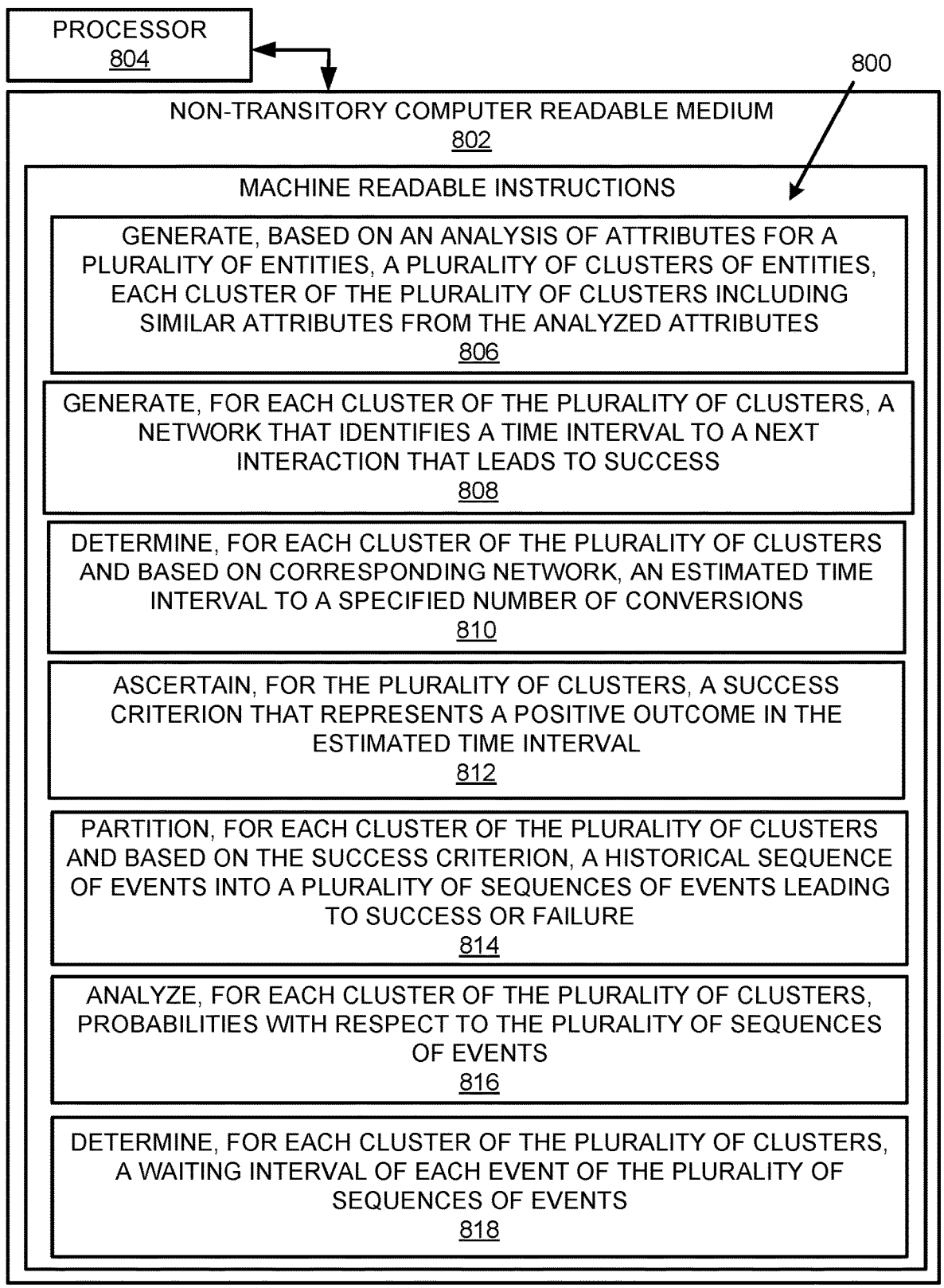
FIG. 8 illustrates a further example block diagram for sequence, frequency, and time interval based journey recommendation in accordance with another example of the present disclosure.
Figure 8:
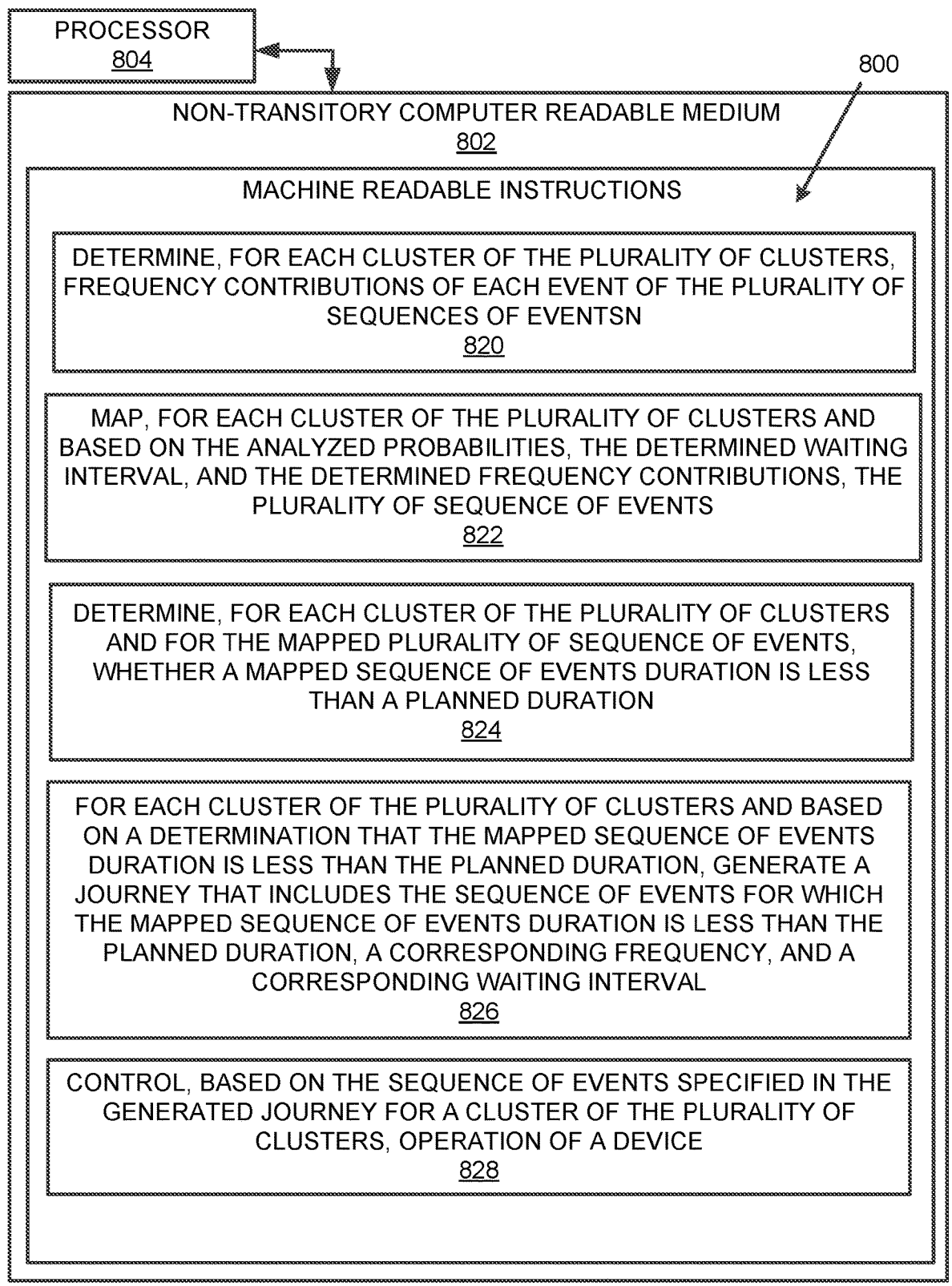

FIGS. 6-8 respectively illustrate an example block diagram 600, a flowchart of an example method 700, and a further example block diagram 800 for sequence, frequency, and time interval based journey recommendation, according to examples. The block diagram 600, the method 700, and the block diagram 800 may be implemented on the apparatus 100 described above with reference to FIG. 1 by way of example and not of limitation. The block diagram 600, the method 700, and the block diagram 800 may be practiced in other apparatus. In addition to showing the block diagram 600, FIG. 6 shows hardware of the apparatus 100 that may execute the instructions of the block diagram 600. The hardware may include a processor 602, and a memory 604 storing machine readable instructions that when executed by the processor cause the processor to perform the instructions of the block diagram 600. The memory 604 may represent a non-transitory computer readable medium. FIG. 7 may represent an example method for sequence, frequency, and time interval based journey recommendation, and the steps of the method. FIG. 8 may represent a non-transitory computer readable medium 802 having stored thereon machine readable instructions to provide sequence, frequency, and time interval based journey recommendation according to an example. The machine readable instructions, when executed, cause a processor 804 to perform the instructions of the block diagram 800 also shown in FIG. 8.

The processor 602 of FIG. 6 and/or the processor 804 of FIG. 8 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 802 of FIG. 8), such as hardware storage devices (e.g., RAM (random access memory), ROM (read only memory), EPROM (erasable, programmable ROM), EEPROM (electrically erasable, programmable ROM), hard drives, and flash memory). The memory 604 may include a RAM, where the machine readable instructions and data for a processor may reside during runtime.

Referring to FIGS. 1-6, and particularly to the block diagram 600 shown in FIG. 6, the memory 604 may include instructions 606 to analyze attributes 104 for a plurality of entities 106.

The processor 602 may fetch, decode, and execute the instructions 608 to generate, based on the analysis of the plurality of attributes 104, a plurality of clusters 108 of entities. Each cluster of the plurality of clusters 108 may include similar attributes from the analyzed attributes.

The processor 602 may fetch, decode, and execute the instructions 610 to generate, for each cluster of the plurality of clusters 108, a network 112 that identifies a time interval to a next interaction that leads to success.

The processor 602 may fetch, decode, and execute the instructions 612 to determine, for each cluster of the plurality of clusters 108 and based on corresponding network, an estimated time interval to a specified number of conversions.

The processor 602 may fetch, decode, and execute the instructions 614 to ascertain, for the plurality of clusters 108, a success criterion 116 that represents a positive outcome in the estimated time interval.

The processor 602 may fetch, decode, and execute the instructions 616 to partition, for each cluster of the plurality of clusters and based on the success criterion 116, a historical sequence of events into a plurality of sequences of events 118 leading to success or failure.

The processor 602 may fetch, decode, and execute the instructions 618 to analyze, for each cluster of the plurality of clusters, probabilities 122 with respect to the plurality of sequences of events 118.

The processor 602 may fetch, decode, and execute the instructions 620 to determine, for each cluster of the plurality of clusters, a waiting interval 126 of each event of the plurality of sequences of events 118.

The processor 602 may fetch, decode, and execute the instructions 622 to determine, for each cluster of the plurality of clusters, frequency contributions 130 of each event of the plurality of sequences of events 118.

The processor 602 may fetch, decode, and execute the instructions 624 to map, for each cluster of the plurality of clusters and based on the analyzed probabilities 122, the determined waiting interval 126, and the determined frequency contributions 130, the plurality of sequence of events 118.

The processor 602 may fetch, decode, and execute the instructions 626 to determine, for each cluster of the plurality of clusters and for the mapped plurality of sequence of events 118, whether a mapped sequence of events duration is less than a planned duration.

For each cluster of the plurality of clusters and based on a determination that the mapped sequence of events duration is less than the planned duration, the processor 602 may fetch, decode, and execute the instructions 628 to generate a journey 136 that includes the sequence of events 118 for which the mapped sequence of events duration is less than the planned duration, a corresponding frequency, and a corresponding waiting interval.

Referring to FIGS. 1-5 and 7, and particularly FIG. 7, for the method 700, at block 702, the method may include analyzing attributes 104 for a plurality of entities 106.

At block 704, the method may include generating, based on the analysis of the plurality of attributes 104, a plurality of clusters 108 of entities. Each cluster of the plurality of clusters 108 may include similar attributes from the analyzed attributes.

At block 706, the method may include generating, for each cluster of the plurality of clusters 108, a network 112 that identifies a time interval to a next interaction that leads to success.

At block 708, the method may include determining, for each cluster of the plurality of clusters 108 and based on corresponding network, an estimated time interval to a specified number of conversions.

At block 710, the method may include ascertaining, for the plurality of clusters 108, a success criterion 116 that represents a positive outcome in the estimated time interval.

At block 712, the method may include partitioning, for each cluster of the plurality of clusters and based on the success criterion 116, a historical sequence of events into a plurality of sequences of events 118 leading to success or failure.

At block 714, the method may include analyzing, for each cluster of the plurality of clusters, probabilities 122 with respect to the plurality of sequences of events 118.

At block 716, the method may include determining, for each cluster of the plurality of clusters, a waiting interval 126 of each event of the plurality of sequences of events 118.

At block 718, the method may include determining, for each cluster of the plurality of clusters, frequency contributions 130 of each event of the plurality of sequences of events 118.

At block 720, the method may include mapping, for each cluster of the plurality of clusters and based on the analyzed probabilities 122, the determined waiting interval 126, and the determined frequency contributions 130, the plurality of sequence of events 118.

At block 722, the method may include determining, for each cluster of the plurality of clusters and for the mapped plurality of sequence of events 118, whether a mapped sequence of events duration is less than a planned duration.

For each cluster of the plurality of clusters, based on a determination that the mapped sequence of events duration is less than the planned duration, at block 724, the method may include generating a journey 136 that includes the sequence of events 118 for which the mapped sequence of events duration is less than the planned duration, a corresponding frequency, and a corresponding waiting interval.

At block 726, the method may include controlling, based on the sequence of events specified in the generated journey 136 for a cluster of the plurality of clusters, operation of a device.

Referring to FIGS. 1-5 and 8, and particularly FIG. 8, for the block diagram 800, the non-transitory computer readable medium 802 may include instructions 806 to generate, based on analysis of a plurality of attributes 104 for a plurality of entities 106, a plurality of clusters 108 of entities. Each cluster of the plurality of clusters 108 may include similar attributes from the analyzed attributes.

The processor 804 may fetch, decode, and execute the instructions 808 to generate, for each cluster of the plurality of clusters 108, a network 112 that identifies a time interval to a next interaction that leads to success.

The processor 804 may fetch, decode, and execute the instructions 810 to determine, for each cluster of the plurality of clusters 108 and based on corresponding network, an estimated time interval to a specified number of conversions.

The processor 804 may fetch, decode, and execute the instructions 812 to ascertain, for the plurality of clusters 108, a success criterion 116 that represents a positive outcome in the estimated time interval.

The processor 804 may fetch, decode, and execute the instructions 814 to partition, for each cluster of the plurality of clusters and based on the success criterion 116, a historical sequence of events into a plurality of sequences of events 118 leading to success or failure.

The processor 804 may fetch, decode, and execute the instructions 816 to analyze, for each cluster of the plurality of clusters, probabilities 122 with respect to the plurality of sequences of events 118.

The processor 804 may fetch, decode, and execute the instructions 818 to determine, for each cluster of the plurality of clusters, a waiting interval 126 of each event of the plurality of sequences of events 118.

The processor 804 may fetch, decode, and execute the instructions 820 to determine, for each cluster of the plurality of clusters, frequency contributions 130 of each event of the plurality of sequences of events 118.

The processor 804 may fetch, decode, and execute the instructions 822 to map, for each cluster of the plurality of clusters and based on the analyzed probabilities 122, the determined waiting interval 126, and the determined frequency contributions 130, the plurality of sequence of events 118.

The processor 804 may fetch, decode, and execute the instructions 824 to determine, for each cluster of the plurality of clusters and for the mapped plurality of sequence of events 118, whether a mapped sequence of events duration is less than a planned duration.

For each cluster of the plurality of clusters, based on a determination that the mapped sequence of events duration is less than the planned duration, the processor 804 may fetch, decode, and execute the instructions 826 to generate a journey 136 that includes the sequence of events 118 for which the mapped sequence of events duration is less than the planned duration, a corresponding frequency, and a corresponding waiting interval.

The processor 804 may fetch, decode, and execute the instructions 828 to control, based on the sequence of events specified in the generated journey 136 for a cluster of the plurality of clusters, operation of a device.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A machine-learning based journey recommendation apparatus comprising:
   at least one hardware processor; and
   a memory storing instructions, which when executed by the at least one hardare processor, cause the at least one hardware processor to:
   analyze attributes for a plurality of entities;
   generate, based on the analysis of the plurality of attributes, a plurality of clusters of entities, each cluster of the plurality of clusters of entities including similar attributes from the analyzed attributes;
   generate, for each cluster of the plurality of clusters of entities, a network that identifies a time interval to a next interaction that leads to success;
   determine, for each cluster of the plurality of clusters of entities and based on a corresponding network, an estimated time interval to a specified number of conversions;
   ascertain, for the plurality of clusters of entities, a success criterion that represents a positive outcome in the estimated time interval, wherein the success criterion is defined based on maintenance of central processing unit (CPI)) usage and productivity and includes a run of processes based on usage and productivity levels or a service level agreement, and the success criterion varies across industry for the plurality of clusters of entities and indicates a benchmark proportion that can be utilized for the plurality of clusters of entities;
   partition, for each cluster of the plurality of clusters of entities and based on the success criterion, a historical sequence of events into a plurality of sequences of events at an entity level leading to success or failure;
   analyze, for each cluster of the plurality of clusters of entities, probabilities with respect to the plurality of sequences of events;
   determine, for each cluster of the plurality of clusters of entities, a waiting interval of each event of the plurality of sequences of events;
   determine, for each cluster of the plurality of clusters of entities, frequency contributions of each event of the plurality of sequences of events;
   determine, for each entity in each cluster of the plurality of clusters of entities, the plurality of sequence of events at the entity level based on an observed event frequency and a waiting time of events for each entity;
   determine, for each entity in each cluster of the plurality of clusters of entities and for the plurality of sequence of events, whether a sequence of events duration is less than a planned duration; and
   for each entity in each cluster of the plurality of clusters of entities, based on a determination that the sequence of events duration is less than the planned duration, generate a journey that includes the sequence of events for which the sequence of events duration is less than the planned duration, a corresponding frequency, and a corresponding waiting interval, wherein the journey specifies operations to be implemented by a device that increases efficiency of operation of the device compared to an efficiency associated with performance of a pre-specified set of operations.

2. The apparatus according to claim 1, wherein the instructions, when executed by the at least one hardware processor, cause the at least one hardware processor to analyze, for each cluster of the plurality of clusters of entities, probabilities with respect to the plurality of sequences of events by:

determining, for each cluster of the plurality of clusters of entities and for each sequence of events of the plurality of sequences of events, a probability of progression of a sequence of events to another sequence of events.

3. The apparatus according to claim 1, wherein the instructions, when executed by the at least one hardware processor, cause the at least one hardware processor to analyze, for each cluster of the plurality of clusters of entities, probabilities with respect to the plurality of sequences of events by:

determining, for each cluster of the plurality of clusters of entities and for each sequence of events of the plurality of sequences of events, progressive conditional probabilities of success given a sequence of events.

4. The apparatus according to claim 1, wherein the instructions, when executed by the at least one hardware processor, cause the at least one hardware processor to analyze, for each duster of the plurality of clusters of entities, probabilities with respect to the plurality of sequences of events by:

determining, for each duster of the plurality of dusters of entities and for each sequence of events of the plurality of sequences of events, a probability of progression of a sequence of events to another sequence of events;

determining, for each cluster of the plurality of clusters of entities and for each sequence of events of the plurality of sequences of events, progressive conditional probabilities of success given a sequence of events; and simulating, for each cluster of the plurality of clusters of entities and based on the determined probability of progression and the determined progressive conditional probabilities, probabilities of success for propagation of a sequence of events.

5. The apparatus according to claim 1, wherein the instructions, when executed by the at least one hardware processor, cause the at least one hardware processor to determine, for each cluster of the plurality of clusters of entities, the waiting interval of each event of the plurality of sequences of events by:

ascertaining, for each cluster of the plurality of clusters of entities, a frequency count of all events of the plurality of sequences of events resulting in success;

ascertaining, for each cluster of the plurality of clusters of entities, a frequency contribution of each event of the plurality of sequences of events at a cluster level; and determining, for each cluster of the plurality of clusters of entities and based on the ascertained frequency count and the ascertained frequency contribution, the waiting interval of each event of the plurality of sequences of events.

6. The apparatus according to claim 1, wherein the instructions, when executed by the at least one hardware processor, cause the at least one hardware processor to determine, for each cluster of the plurality of clusters of entities, frequency contributions of each event of the plurality of sequences of events by:

ascertaining, for each cluster of the plurality of clusters of entities, a frequency count of all events of the plurality of sequences of events resulting in success;

ascertaining, for each cluster of the plurality of clusters of entities, a frequency contribution of each event of the plurality of sequences of events at a cluster level; and determining, for each cluster of the plurality of clusters of entities and based on the ascertained frequency count and the ascertained frequency contribution, the frequency contributions of each event of the plurality of sequences of events.

7. The apparatus according to claim 1, wherein the instructions, when executed by the at least one hardware processor, cause the at least one hardware processor is executed by the at least one hardware processor to:

optimize, for the plurality of entities, frequencies from the frequency contributions to maximize a probability of success for a variation in a frequency of events.

8. The apparatus according to claim 1, wherein the specified number of conversions represents a percentage of conversions.

9. A computer implemented method for sequence, frequency, and time interval based journey recommendation, the method comprising:

analyzing attributes for a plurality of entities;

generating, based on the analysis of the plurality of attributes, a plurality of clusters of entities, each cluster of the plurality of clusters of entities including similar attributes from the analyzed attributes;

generating, for each duster of the plurality of dusters of entities, a network that identifies a time interval to a next interaction that leads to success;

determining, for each cluster of the plurality of dusters of entities and based on a corresponding network, an estimated time interval to a specified number of conversions;

ascertaining, for the plurality of clusters of entities, a success criterion that represents a positive outcome in the estimated time interval, wherein the success criterion is defined based on maintenance of central processing unit (CPU) usage and productivity and includes a run of processes based on usage and productivity levels or a service level agreement, and the success criterion varies across industry for the plurality of clusters of entities and indicates a benchmark proportion that can be utilized for the plurality of clusters of entities;

partitioning, for each cluster of the plurality of clusters of entities and based on the success criterion, a historical sequence of events into a plurality of sequences of events at an entity level leading to success or failure;

analyzing, for each cluster of the plurality of clusters of entities, probabilities with respect to the plurality of sequences of events;

determining, for each cluster of the plurality of clusters of entities, a waiting interval of each event of the plurality of sequences of events;

determining, for each cluster of the plurality of clusters, frequency contributions of each event of the plurality of sequences of events;

determining, for each entity in each cluster of the plurality of clusters of entities, the plurality of sequence of events at the entity level based on an observed event frequency and a waiting time of events for each entity;

determine, for each entity in each cluster of the plurality of clusters of entities and for the plurality of sequence of events, whether a sequence of events duration is less than a planned duration;

for each entity in each cluster of the plurality of clusters of entities, based on a determination that the sequence of events duration is less than the planned duration, generate a journey that includes the sequence of events for which the sequence of events duration is less than the planned duration, a corresponding frequency, and a corresponding waiting interval, wherein the journey specifies operations to be implemented by a device that increases efficiency of operation of the device compared to an efficiency associated with performance of a pre-specified set of operations; and controlling, based on the sequence of events specified in the generated journey for a cluster of the plurality of clusters of entities, operation of the device.

10. The method according to claim 9, wherein analyzing, for each cluster of the plurality of clusters of entities, probabilities with respect to the plurality of sequences of events further comprises:

determining, for each cluster of the plurality of clusters of entities and for each sequence of events of the plurality of sequences of events, a probability of progression of a sequence of events to another sequence of events.

11. The method according to claim 9, wherein analyzing, for each cluster of the plurality of clusters of entities, probabilities with respect to the plurality of sequences of events further comprises:

determining, for each cluster of the plurality of clusters of entities and for each sequence of events of the plurality of sequences of events, progressive conditional probabilities of success given a sequence of events.

12. The method according to claim 9, wherein analyzing, for each cluster of the plurality of clusters of entities, probabilities with respect to the plurality of sequences of events further comprises:

determining, for each cluster of the plurality of clusters of entities and for each sequence of events of the plurality of sequences of events, a probability of progression of a sequence of events to another sequence of events;

determining, for each cluster of the plurality of clusters of entities and for each sequence of events of the plurality of sequences of events, progressive conditional probabilities of success given a sequence of events; and simulating, for each cluster of the plurality of clusters of entities and based on the determined probability of progression and the determined progressive conditional probabilities, probabilities of success for propagation of a sequence of events.

13. The method according to claim 9, wherein determining, for each cluster of the plurality of clusters of entities, the waiting interval of each event of the plurality of sequences of events further comprises:

ascertaining, for each cluster of the plurality of clusters of entities, a frequency count of all events of the plurality of sequences of events resulting in success;

ascertaining, for each cluster of the plurality of clusters of entities, a frequency contribution of each event of the plurality of sequences of events at a cluster level; and determining, for each cluster of the plurality of clusters of entities and based on the ascertained frequency count and the ascertained frequency contribution, the waiting interval of each event of the plurality of sequences of events.

14. The method according to claim 9, wherein determining, for each cluster of the plurality of clusters of entities, frequency contributions of each event of the plurality of sequences of events further comprises:

ascertaining, for each cluster of the plurality of clusters of entities, a frequency count of all events of the plurality of sequences of events resulting in success;

ascertaining, for each cluster of the plurality of clusters of entities, a frequency contribution of each event of the plurality of sequences of events at a cluster level; and determining, for each cluster of the plurality of clusters of entities and based on the ascertained frequency count and the ascertained frequency contribution, the frequency contributions of each event of the plurality of sequences of events.

15. The method according to claim 9, further comprising:

optimizing, for the plurality of entities, frequencies from the ascertained frequency contributions to maximize a probability of success for a variation in a frequency of events.

16. A non-transitory computer readable medium having stored thereon machine readable instructions, the machine readable instructions, when executed by at least one hardware processor, cause the at least one hardware processor to:

generate, based on an analysis of attributes for a plurality of entities, a plurality of clusters of entities, each cluster of the plurality of clusters of entities including similar attributes from the analyzed attributes;

generate, for each cluster of the plurality of clusters of entities, a network that identifies a time interval to a next interaction that leads to success;

determine, for each cluster of the plurality of clusters of entities and based on corresponding network, an estimated time interval to a specified number of conversions;

ascertain, for the plurality of clusters of entities, a success criterion that represents a positive outcome in the estimated time interval, wherein the success criterion is defined based on maintenance of central processing unit (CPU) usage and productivity and includes a run of processes based on usage and productivity levels or a service level agreement, and the success criterion varies across industry for the plurality of clusters of entities and indicates a benchmark proportion that can be utilized for the plurality of clusters of entities;

partition, for each cluster of the plurality of clusters of entities and based on the success criterion, a historical sequence of events into a plurality of sequences of events at an entity level leading to success or failure;

analyze, for each cluster of the plurality of clusters of entities, probabilities with respect to the plurality of sequences of events;

determine, for each cluster of the plurality of clusters of entities, a waiting interval of each event of the plurality of sequences of events;

determine, for each cluster of the plurality of clusters of entities, frequency contributions of each event of the plurality of sequences of events;

determine for each entity in each cluster of the plurality of clusters of entities the plurality of sequence of events at the entity level based on an observed event frequency and a waiting time of events for each entity;

determine, for each entity in each cluster of the plurality of clusters of entities and for the mapped plurality of sequence of events, whether a sequence of events duration is less than a planned duration;

for each entity in each cluster of the plurality of clusters of entities, based on a determination that the sequence of events duration is less than the planned duration, generate a journey that includes the sequence of events for which the sequence of events duration is less than the planned duration, a corresponding frequency, and a corresponding waiting interval, wherein the journey specifies operations to be implemented by a device that increases efficiency of operation of the device compared to an efficiency associated with performance of a pre-specified set of operations; and control, based on the sequence of events specified in the generated journey for a cluster of the plurality of clusters of entities, operation of the device.

17. The non-transitory computer readable medium according to claim 16, wherein the machine readable instructions to analyze, for each cluster of the plurality of clusters of entities, probabilities with respect to the plurality of sequences of events, when executed by the at least one hardware processor, further cause the at least one hardware processor to:

determine, for each cluster of the plurality of clusters of entities and for each sequence of events of the plurality of sequences of events, a probability of progression of a sequence of events to another sequence of events.

18. The non-transitory computer readable medium according to claim 16, wherein the machine readable instructions to analyze, for each cluster of the plurality of clusters of entities, probabilities with respect to the plurality of sequences of events, when executed by the at least one hardware processor, further cause the at least one hardware processor to:

determine, for each cluster of the plurality of clusters of entities and for each sequence of events of the plurality of sequences of events, progressive conditional probabilities of success given a sequence of events.

19. The non-transitory computer readable medium according to claim 16, wherein the machine readable instructions to determine, for each cluster of the plurality of clusters of entities, the waiting interval of each event of the plurality of sequences of events, when executed by the at least one hardware processor, further cause the at least one hardware processor to:

ascertain, for each cluster of the plurality of clusters of entities, a frequency count of all events of the plurality of sequences of events resulting in success;

ascertain, for each cluster of the plurality of clusters of entities, a frequency contribution of each event of the plurality of sequences of events at a cluster level; and determine, for each cluster of the plurality of dusters of entities and based on the ascertained frequency count and the ascertained frequency contribution; the waiting interval of each event of the plurality of sequences of events.

20. The non-transitory computer readable medium according to claim 16, wherein the machine readable instructions to determine, for each cluster of the plurality of clusters, frequency contributions of each event of the plurality of sequences of events, when executed by the at least one hardware processor, further cause the at least one hardware processor to:

ascertain, for each cluster of the plurality of clusters of entities, a frequency count of all events of the plurality of sequences of events resulting in success;

ascertain, for each cluster of the plurality of clusters of entities, a frequency contribution of each event of the plurality of sequences of events at a cluster level; and determine, for each cluster of the plurality of clusters of entities and based on the ascertained frequency count and the ascertained frequency contribution, the frequency contributions of each event of the plurality of sequences of events.

\* \* \* \* \*

UNITED STATES PATENT AND TRADEMARK OFFICE
CERTIFICATE OF CORRECTION

PATENT NO. : 11,403,555 B2
APPLICATION NO. : 16/297314
DATED : August 2, 2022
INVENTOR(S) : Ruchika Sachdeva et al.

It is certified that error appears in the above-identified patent and that said Letters Patent is hereby corrected as shown below:

In the Claims

At Claim 1, Column 16, Line 17, the phrase "hard are processor" should instead read "hardware processor".

At Claim 1, Column 16, Line 35, the phrase "central processing unit (CPI)" should instead read "central processing unit (CPU)".

At Claim 4, Column 17, Line 32, the phrase "each duster" should instead read "each cluster".

At Claim 4, Column 17, Line 35, the phrase "each duster of the plurality of dusters" should instead read "each cluster of the plurality of clusters".

At Claim 9, Column 18, Line 33, the phrase "each duster of the plurality of dusters" should instead read "each cluster of the plurality of clusters".

At Claim 9, Column 18, Line 36, the phrase "the plurality of dusters" should instead read "the plurality of clusters".

Signed and Sealed this
First Day of August, 2023

Katherine Kelly Vidal
*Director of the United States Patent and Trademark Office*